United States Patent [19]
Buckley et al.

[11] Patent Number: 5,225,911
[45] Date of Patent: Jul. 6, 1993

[54] MEANS FOR COMBINING DATA OF DIFFERENT FREQUENCIES FOR A RASTER OUTPUT DEVICE

[75] Inventors: Robert R. Buckley; David E. Rumph, both of Pasadena, Calif.

[73] Assignee: Xerox Corporation, Stamford, Conn.

[21] Appl. No.: 696,681

[22] Filed: May 7, 1991

[51] Int. Cl.$^5$ .............................................. H04N 1/21
[52] U.S. Cl. .................................. 358/296; 358/462; 358/75
[58] Field of Search ................... 358/296, 75, 78, 462; 395/144, 145, 147; 346/157

[56] References Cited

U.S. PATENT DOCUMENTS

| | | | |
|---|---|---|---|
| 4,803,643 | 2/1989 | Hickey | 395/147 |
| 4,949,188 | 8/1990 | Sato | 358/462 X |
| 4,958,219 | 9/1990 | Kadowaki | 358/75 |
| 4,963,898 | 10/1990 | Kadowaki et al. | 346/157 |
| 5,113,492 | 5/1992 | Ariki et al. | 395/147 |

OTHER PUBLICATIONS

D. E. Troxel et al. IEEE Trans. Systems, Man and Cybernetics, vol. SMC-11, No. 9, Sep. 1981, pp. 585-596.
ANSI IT8.2-1988, User Exchange Format for the Exchange of Line Art Data between Electronic Prepress Systems via Magnetic Tape.
ANSI IT8.4-1990, Device Exchange Format for the On-Line Transfer of Color Proofs from Electronic Prepress to Direct Digital Color Proofing Systems.
Intelligent Processing Unit Series, Service Manual, Revision O, Apr. 1989; Canon Color Laser Copier 500 IPU.
Canon Color Laser Copier 500 IPU Programming Manual, Draft, Aug. 28, 1989.

*Primary Examiner*—Benjamin R. Fuller
*Assistant Examiner*—Eric Frahm
*Attorney, Agent, or Firm*—Robert E. Cunha

[57] ABSTRACT

A circuit for enabling the raster display of text or line art in one constant color against a background of another constant color or against a continuous-tone picture, or the display of a continuous-tone picture through an arbitrary shape. The circuit has four channels, one each for constant colors, continuous-tone images, image masks, and instructions. The constant colors are stored in the first channel in the form of two 8-bit colors, one for the text or line art and one for the background. Any color pair can be read from this memory, divided into two 8-bit colors, and presented at two inputs of a final multiplexer. The second channel stores continuous tone color pictures and presents this information at a third input of the multiplexer. The third channel receives masks or outlines in the form of bitmaps and the fourth channel receives instructions which may be run-length encoded. These two channels combine their data, which is then used to control the multiplexer.

3 Claims, 23 Drawing Sheets

| Mask | InstC | Multiplexer 28 Output |
|------|-------|----------------------|
| X    | 0     | ColorA               |
| X    | 1     | ColorB               |
| 0    | 2     | ColorA               |
| 1    | 2     | ColorB               |
| 0    | 3     | ColorB               |
| 1    | 3     | ColorA               |

X = don't care

| Mode | Mask | ColorSelect | Printer Video |
|------|------|-------------|---------------|
| 0 | X | 0 | Faxed |
| 1 | X | 1 | Contone |
| 2 | X | 2 | ConstantA |
| 3 | X | 3 | ConstantB |
| 4 | 0 | 1 | Contone |
| 4 | 1 | 2 | ConstantA |
| 5 | 0 | 2 | ConstantA |
| 5 | 1 | 1 | Contone |
| 6 | 0 | 2 | ConstantA |
| 6 | 1 | 3 | ConstantB |
| 7 | X | X | Blanked |

X = Don't Care

*Fig. 3B*

MEANS FOR COMBINING DATA OF DIFFERENT FREQUENCIES FOR A RASTER OUTPUT DEVICE

BACKGROUND OF THE INVENTION

This invention is a method for merging different raster images, representing contone data (continuous-tone pictures) and line art (text and graphics), into a single multi-level or grayscale raster image suitable for driving a grayscale printer or other output raster device, or a binary raster printer via a halftone generator.

A potentially useful feature of a printer would be the ability to print text overlaid on a scanned picture. Printer controllers are normally designed for printing one or the other. A printer controller for text would send a high-resolution bitmap to the print engine which prints the output hard copy, while a controller for scanned pictures would send a medium-resolution byte map which a halftone generator would convert into a high resolution bitmap for driving a binary print engine.

When text and scanned pictures are combined, the controller would send the common denominator to the print engine in the form of a high-resolution byte map. In other words, if the text is being received at 300 bits per inch and the pictures are being received at 100 pixels per inch and 8 bits per pixel, a final raster resolution of 300 pixels per inch, 8 bits per pixel, would accommodate both inputs. In a typical system, a page buffer with the capacity to store a page of raster data at the final raster resolution is loaded with text and pictures, and then the raster data are sent to the print engine line by line from the buffer. However, this system of converting data to a common form before merging them is not efficient in terms of handling text where there is a requirement for high resolution at the edges of the characters, but where the color either seldom changes, or is constant. Similarly, a byte map is fine for scanned pictures, but high-spatial resolution is not required. The basic problem, therefore, is how to efficiently handle text and graphics at one spatial resolution, and scanned pictures at another, to produce a final print containing both.

In the prior art, graphic arts applications have already had to deal with electronically merging scanned pictures, text and line art, and methods have been described that combine high-resolution binary or line art data and medium-resolution multi-bit picture data.

In Hell graphic arts film plotters (ca. 1982), raster data is sent to the halftone generator and output scanner as a sequence of bytes. A bit in each byte identifies six of the remaining bits as either contone data to be sent to the output scanner via the halftone generator, or as binary data, packed six bits to a byte, that is to bypass the halftone generator and be sent directly to the output scanner. The spatial resolution of the binary data is six times the spatial resolution of the contone data.

A similar approach was taken in an MIT-built computer controller for engraving gravure cylinders [D.E. Troxel et al., IEEE Trans. Systems, Man and Cybernetics, Vol. SMC-11, No. 9, September 1981, pp. 585–596]. In a sequence of bytes, graphics data (text and line art) was stored as two 4-bit samples per byte, while contone data was stored as one 8-bit sample per byte. In both cases, one byte of data was used to engrave one gravure cell. The spatial resolution of the binary data is twice the spatial resolution of the contone data. A 4-bit value and and 8-bit value were reserved as codes to switch between graphics and contone data in the byte sequence.

In current standards for the interchange of graphic arts data, there are separate standards for line art data and for continuous-tone pictures. A line art image consists of a rectangular array of picture elements, each of which holds a limited number of colors defined in a color table [ANSI IT8.2-1988, User Exchange Format for the Exchange of Line Art Data between Electronic Prepress Systems via Magnetic Tape]. Because a line art image typically has continuous areas of many pixels of the same color (and the same color table entry), it is amenable to run-length coding. One of the color table entries is reserved for a transparent color. A transparent color is used to distinguish a run where no color is present and the underlying color (if any) is allowed to show through.

In files which contain both line art and contone picture data, the line art data and the contone picture data are represented separately [ANSI IT8.4-1990, Device Exchange Format for the On-Line Transfer of Color Proofs from Electronic Prepress Systems to Direct Digital Color Proofing Systems]. Where they overlap, the line art data takes precedence. For the picture data to be visible when overlaid with a line art data, the line art data must be transparent (see FIG. 5A). In this format, the line art and pictures must overlay exactly, that is, cover the same area on the page or image.

A similar approach is described in documentation for the Canon Color Laser Copier Intelligent Processing Unit (IPU) [Intelligent Processing Unit Series, Service Manual, Revision 0, April 1989; Canon Color Laser Copier 500 IPU Programming Manual, Draft, Aug. 28, 1989] (see FIG 5B). The IPU can store contone pictures, a color palette or table, and a binary image. The binary image controls how the contone pictures and the colors defined in the table are combined. Where the binary image has value 1, a color specified by the color table is output. Where the binary image has value 0, corresponding to "transparent," the underlying picture is output.

SUMMARY OF THE INVENTION

There are several ways in which line art (including text) and pictures can combine on a page. They could be completely non-overlapping, with text set against a flat or constant color background. Or the text and picture could overlap, with the text either completely or partly within the boundaries of the picture area. The picture area, usually rectangular, could have an arbitrary shape. All these possibilities could appear on the same page.

In our invention, synthesizing the possible combinations of line art and pictures uses three gray or color multi-bit signals: two flat or constant colors and a scanned picture; and two control signals: a high-resolution binary mask and a multi-bit instruction stream. A constant color is a color whose value is the same for all pixels, unlike the color defined by a scanned picture. A typical line art image is made up of a limited number of constant colors.

Because the color of text is usually constant or changes seldom along a scan line, a high-resolution byte map of a text image on a flat color background can be synthesized from a high-resolution binary mask signal describing the filled outline of the text, and the two multi-bit constant color signals, describing the gray or color values of the text and of the background on which the text is set. By substituting a scanned picture signal for one of the constant color signals, the result is a high-resolution text image overlaid on a scanned picture. Because the background for the text can be either a constant color or a scanned picture, the instruction would indicate which of the two it is.

Along a scan line, the system can merge these three elements; the two constant colors and the scanned picture, selecting between them using a multiplexer under the control of the binary mask and the instruction, to produce a high-resolution multi-bit video signal which would be passed to the output device via a lookup table for tone scale mapping and a register. The resulting video signal could then be used to drive a grayscale display device (such as a monitor), a grayscale printer, or a binary printer via a halftone generator.

All of these signals could have different spatial resolutions or content along the scan line. The constant or flat colors would change infrequently, although high precision may be needed to specify the transitions. The scanned picture would have medium-spatial resolution, and the binary mask would have high-spatial resolution for positioning the edges of text and line art data with high precision.

Using separate components or signals from which the final page image can be simply and easily synthesized has the advantage that the storage format can be optimized for each signal. Because the constant colors and the instruction are the same or change seldom along a scan line, they are good candidates for run-length encoding. The binary mask can be stored compactly using any of the currently-available binary compression algorithms, and the scanned picture can be stored using compression algorithms designed for gray scale image data.

While the Hell, MIT, IT8 and Canon methods are all designed to drive a printer with different data or components, such as line art, scanned, or halftoned data, there are several differences between them and the method described herein.

In the Hell and MIT methods, a single data stream with packed dual-resolution image data is received, unpacked according to embedded control codes and sent to the printer, whereas in this invention, several multi-resolution data streams are received and combined to create a single high-resolution data stream that is sent to the printer. The difference is multi-resolution data that is combined and has to be separated versus multi-resolution data that is separated and has to be combined.

The Hell and MIT methods both use a fixed-sized memory to hold the data describing an entire page, including data for the blank portions of the page. In this invention, the amount of memory data can vary depending on the page content, and data is only stored for non-blank areas of the page.

The IT8 standards describe a format that consists of two components: line art and scanned picture data. While both the IT8 methods and this invention use a scanned picture component, this invention does not have a line art component and would instead generate line art using the method described earlier, combining the two constant colors, binary mask, and instructions. The merging of the line art and scanned picture data in the IT8 method is based on the use of transparent line art, while the merging of the constant colors and scanned picture data in this invention uses a binary mask and instructions.

The Canon method generates a print image from a combination of a scanned picture, a constant color, and a binary image. The Canon method is limited in that the binary image can select the output between only two components; the scanned picture and constant color, whereas this invention adds a third component; another constant color, and an instruction, and can select the output between any two of the three components (the two constant colors and the scanned picture) using the binary mask, according to the instruction. It is also possible in this invention to use the instruction alone to select the output from among the three components.

BRIEF DESCRIPTION OF THE DRAWINGS

FIG. 3B shows one possible mapping from Mode and Mask to the output of multiplexer 37.

DETAILED DESCRIPTION OF THE INVENTION

Figure 1A:
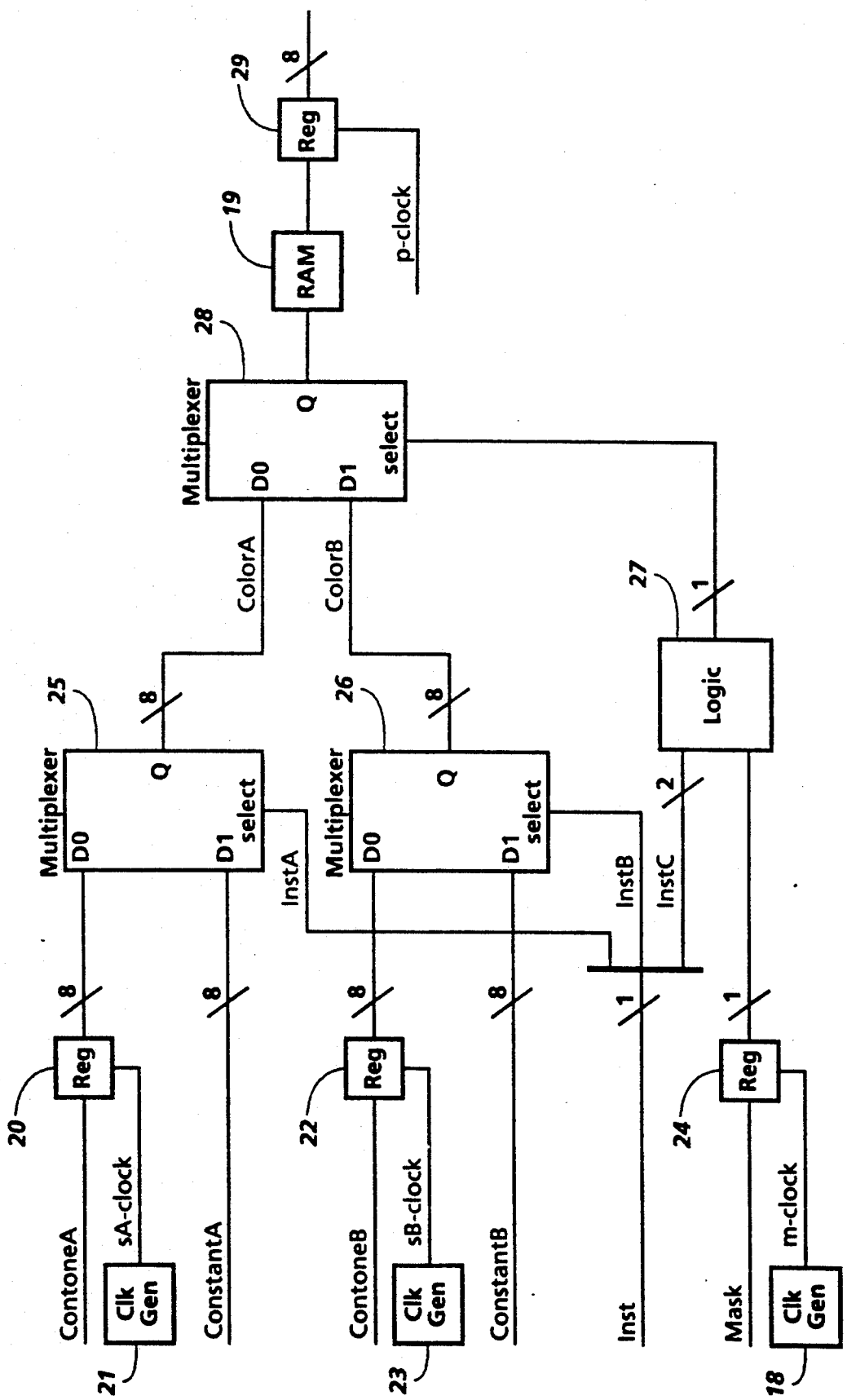
FIG. 1A is a block diagram of a simple implementation of the invention.

FIG. 1A is a block diagram of a simple implementation of the invention. The inputs to the multiplexer 26 are the two possible background colors, either a constant color ConstantB or a scanned picture ContoneB. The scanned picture can vary from one pixel to the next and must be clocked through the clock register 22 by the sB-clock, which is produced by clock generator 23. The output of this multiplexer is selected by the signal InstB, which is a bit from the signal Inst.

The inputs to the multiplexer 25 are the two possible color values, either a constant color ConstantA or a scanned picture ContoneA, that may be overlaid on the background color selected by multiplexer 26. The scanned picture ContoneA can vary from one pixel to the next and must be clocked through the clock register 20 by the sA-clock, which is produced by clock generator 21. The output of this multiplexer is selected by the signal InstA, which is another bit from the signal Inst.

The outputs of multiplexers 25 and 26 are then selected by the multiplexer 28 which is controlled by a logical combination (performed by logic circuit 27) of the binary signal Mask as clocked through the m-clock register 24 by the output of clock generator 18, and InstC, which are two other bits from the signal Inst, to provide an output to the printer video register 29, clocked by the p-clock, via a lookup table RAM 19. The RAM data define a tone reproduction curve for the printer video signal.

Figures 1B, 2:
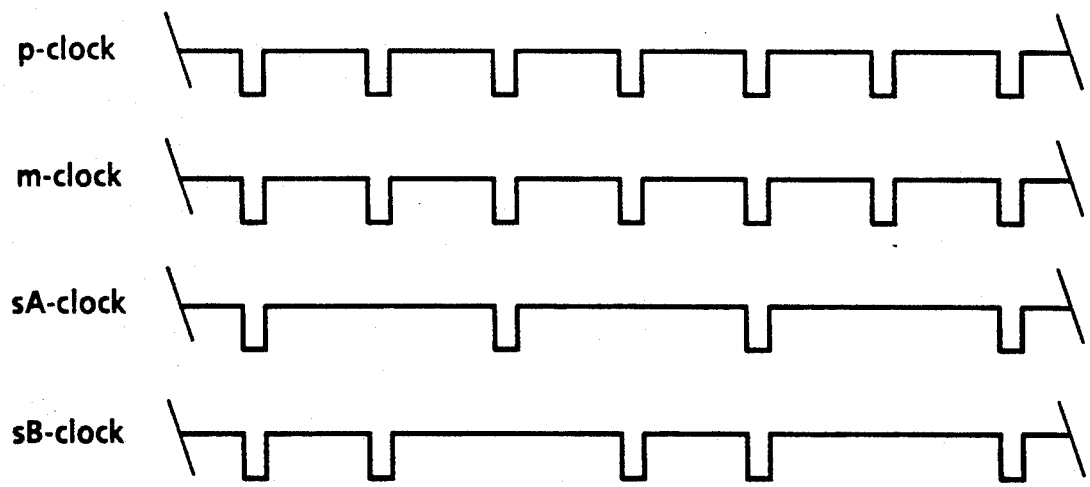
FIG. 1B is a table showing the correspondence between the possible values of InstC and Mask and the output of multiplexer 28.
FIG. 2 shows the timing diagram for one possible set of clocks.

The table of FIG. 1B shows the correspondence between the possible values of Mask and InstC and the output of multiplexer 28.

The output register 29 is clocked by the printer clock, the p-clock. The three raster signals, Mask for the binary mask and ContoneA and ContoneB for the scanned pictures, are obtained from scan line buffers (not shown in the FIG. 1A) and are clocked by the m-clock, the sA-clock, and the sB-clock, respectively. All clocks have periods that are multiples of the p-clock.

Because the raster signals can all use different clock rates, they can have different spatial resolutions. In most cases, the p-clock and the m-clock are the same, i.e. the m-clock is the p-clock divided by 1, so that the bitmap Mask is at the printer resolution. Because the text usually has higher spatial resolution than the scanned picture, the m-clock normally has a higher frequency than the sA-clock or the sB-clock. FIG. 2 shows the timing diagram for one possible set of clocks, where the sA-clock rate is half and the average sB-clock rate is two-thirds the m-clock and p-clock rates.

In cases where mask and scanned picture data may not be defined over some portion of the scan line, their data lines would be blanked.

In FIG. 1A, the three signals, Inst, ConstantA and ConstantB, are assumed to change infrequently. These three together define a state that would be run-length coded, where the run length would be given in terms of printer clock periods or some convenient derivative of them. If the signal Inst can be changed at the resolution of the printer clock, then it would be possible for the transition between the scanned pictures ContoneA and ContoneB to occur within a continuous-tone pixel on a printer pixel boundary.

Figure 3A:
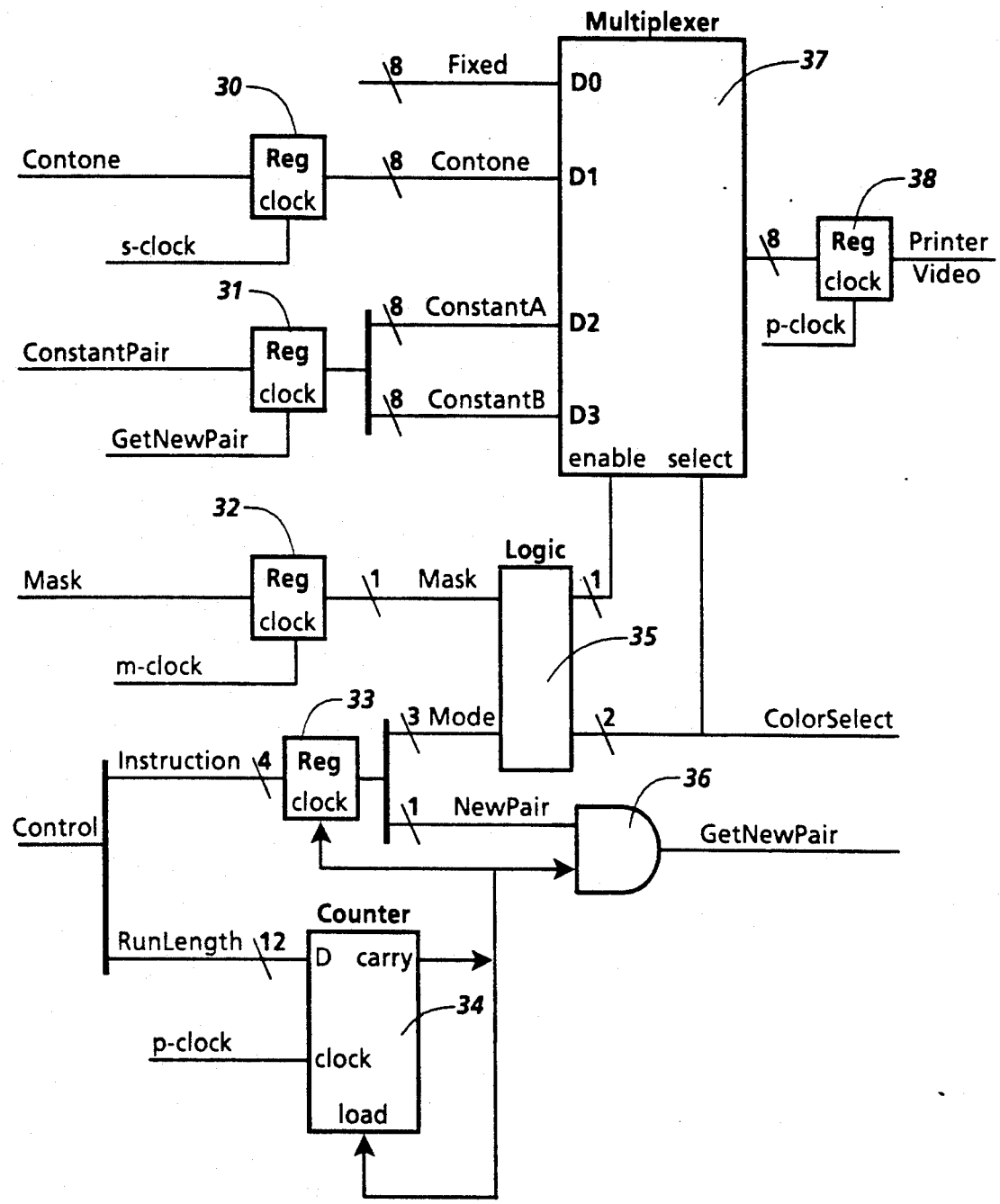
FIG. 3A is a block diagram of an alternate embodiment.

FIG. 3A is a block diagram of an alternate embodiment. The three multiplexers of FIG. 1A have been consolidated into a single four-input multiplexer 37 in FIG. 3A. One input is a scanned picture called Contone clocked through an s-clock register 30. The other two inputs are a pair of constant colors ConstantA and ConstantB which are clocked through register 31 only when a new pair is needed; they are two 8-bit values packed into a single 16-bit word labeled ConstantPair. In this embodiment, it is convenient to treat ConstantA and ConstantB as two halves of one value, rather as two separate values, as was done in FIG. 1A. The second scanned picture in FIG. 1A has been replaced by a fixed value, which could be hardwired or set by switches.

The 2-bit signal ColorSelect chooses which of these four inputs is passed to the multiplexer 37 output and clocked into the printer video register 38 by the printer p-clock. ColorSelect is generated by a logic circuit 35 (implemented by a PROM) whose inputs are a 1-bit signal Mask and a 3-bit signal Mode.

Mask is a high-resolution bitmap, clocked by the m-clock. Mask can represent the filled outline or thresholded version of any scanned object, such as a logo or other piece of line art. The three Mode bits are part of the signal Control which is run-length encoded.

FIG. 3B shows one possible mapping from Mode and Mask to ColorSelect, and the corresponding output of multiplexer 37, which is the printer video signal. Modes 0 to 3 and Mode 7 select the output of multiplexer 37 without regard to the mask value. Modes 4 to 6 select various pairs of inputs between which the mask signal selects the output of the multiplexer.

Text overlaid on a scanned picture can be obtained when Mode=4, where the Mask, describing the filled outline of the text characters, toggles the multiplexer output between the scanned picture (ContoneA) and the color of the text (ConstantA). When Mode=5, the color shown when Mask=1, corresponding to the filled outline of text or line art, is the scanned picture (ContoneA), and the color shown when Mask=0 is ConstantA. Therefore, Mode=5 can be used to image a scanned picture through a mask defined, for instance, by text characters, onto a constant color background. When Mode=6, the Mask signal switches between the two constant colors.

When Mode=0, the Fixed input is passed to the output of multiplexer 37. When Mode=7, the output of multiplexer 37 is disabled and the printer video is blanked.

The raster signals Mask and ContoneA are clocked by the m-clock and the s-clock, respectively, both divided-down versions of the printer p-clock. In the case of a printer-resolution mask, the m-clock and the p-clock are identical, but because Mask usually has a higher spatial resolution than ContoneA, the m-clock is usually faster than the s-clock.

By comparison, the Inst and ConstantPair signals are expected to change much less frequently along a scan line than ContoneA and Mask. Therefore, they are not clocked regularly but are run-length encoded instead.

The three Mode bits together with a bit called New-Pair make up a 4-bit signal or instruction Inst. This instruction occupies the first four bits of the Control signal, the rest of which is taken up by a 12-bit run length.

The run length is loaded into counter 34 of FIG. 3A, which is clocked by the c-clock, a divided-down version of the printer p-clock. Thus, the run length specifies the portions of the scan line, in terms of the c-clock periods, over which the associated instruction applies.

When the run-length counter counts out, a carry pulse is generated. The carry pulse loads a new instruction into the Inst register 33 and a new run length into the counter 34. If the NewPair bit in the current instruction is set, then the carry pulse also generates via gate 36 a GetNewPair pulse that loads a new constant color pair. (In the actual implementation, all the clocks derived from the carry pulse are synchronized to the c-clock). A new instruction is needed whenever the Mode signal or the GetNewPair bit changes.

In a black-and-white printing or display application, the contone signal would be an 8-bit grayscale picture and the two constant colors would be 8-bit gray values. In a color application, the contone signal would be a color separation picture and the two constant colors would be 8-bit color separation values. In the case of process color, for example, there would be four separation: cyan, magenta, yellow and black.

With regard to the printing of color, the traditional way of printing color is to decompose a color image into multiple separations. Once created, each separation is essentially treated as an independent raster image.

By comparison, the method described here decomposes an image into control (Mask and Instruction) and color (Contone and ConstantPair) parts. In the case of a color image, the control parts would be the same for all separations. Only the color parts would be separation-specific, and there would be a different set of contone pictures and constant color pairs for each separation. In other words, where color goes on the page is the same in all separations; only the color parts which specify what color goes on the page will change from separation to separation.

Because all separations can share the Mask and Control data, the incremental cost of printing colored text and graphics with this method is relatively small compared to the traditional method; it only requires adding some constant color pairs. However, in the case of a full page scanned picture, the differences are less great.

FIG. 3A shows the basic idea of merging image signals with different encodings, including different spatial resolution and bits per pixel. The circuit of FIG. 3A uses a high-resolution bitmap and run-length-encoded instruction to multiplex an 8-bit scanned image and two run-length-encoded 8-bit color values onto the printer video line. These signals occupy four channels: ContoneA, ConstantPair, Mask and Control.

Figure 4A:
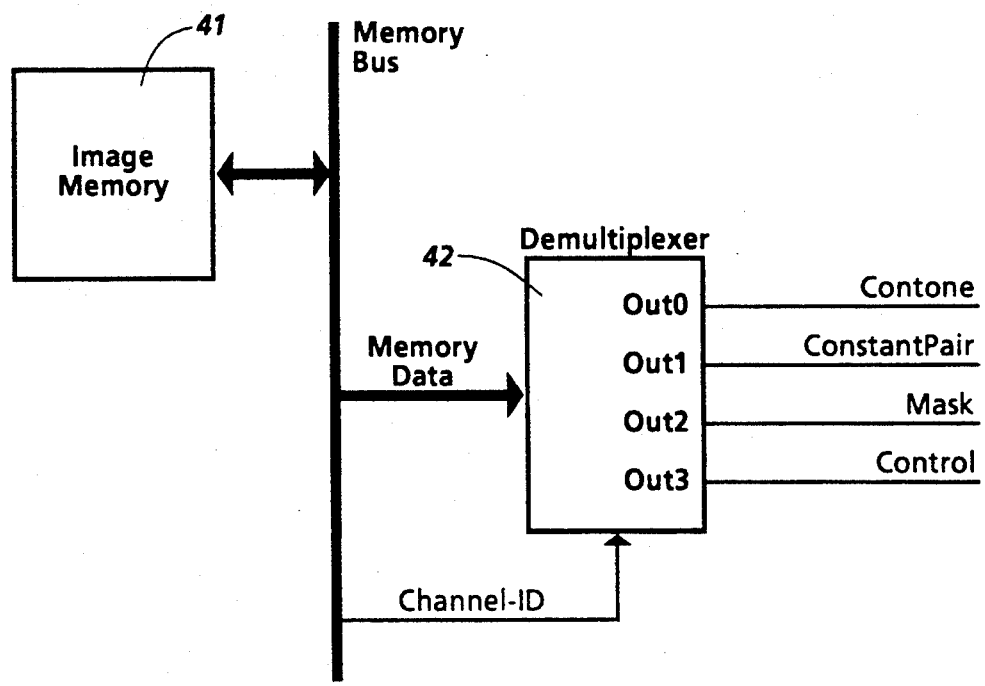
FIG. 4A is a block diagram of an embodiment of the memory storage.

The data for these four channels are obtained from scan-line buffers (not shown in FIG. 3A), which themselves obtain data from one or more image memories or buffers. One possibility is an independent image memory for each channel. However, in the FIG. 4A version, the four channels are fed from a single image memory 41. The channel data reside in different parts of the main image memory and are multiplexed onto the memory bus in the form of tagged packets by a memory controller. The channel for which each packet is intended is specified by two Channel-ID bits, which are set by the memory controller and which determine the scan-line buffer into which the memory bus data is to be written.

Figure 4B:
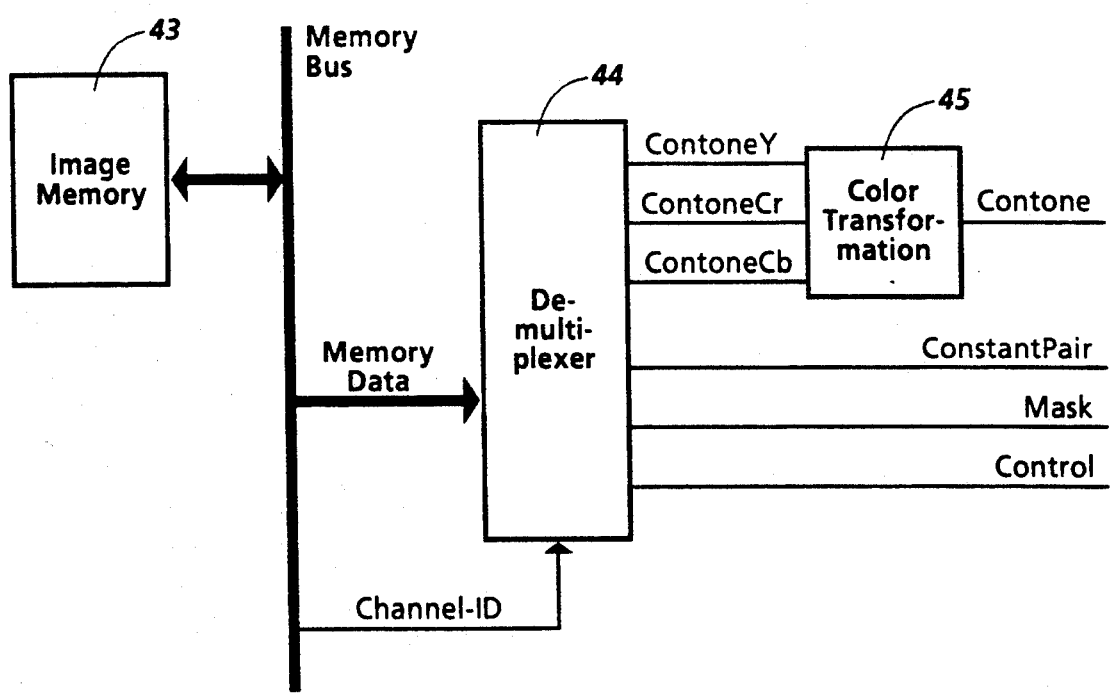
FIG. 4B is a block diagram of an alternate embodiment of the memory storage.
Figure 5A:
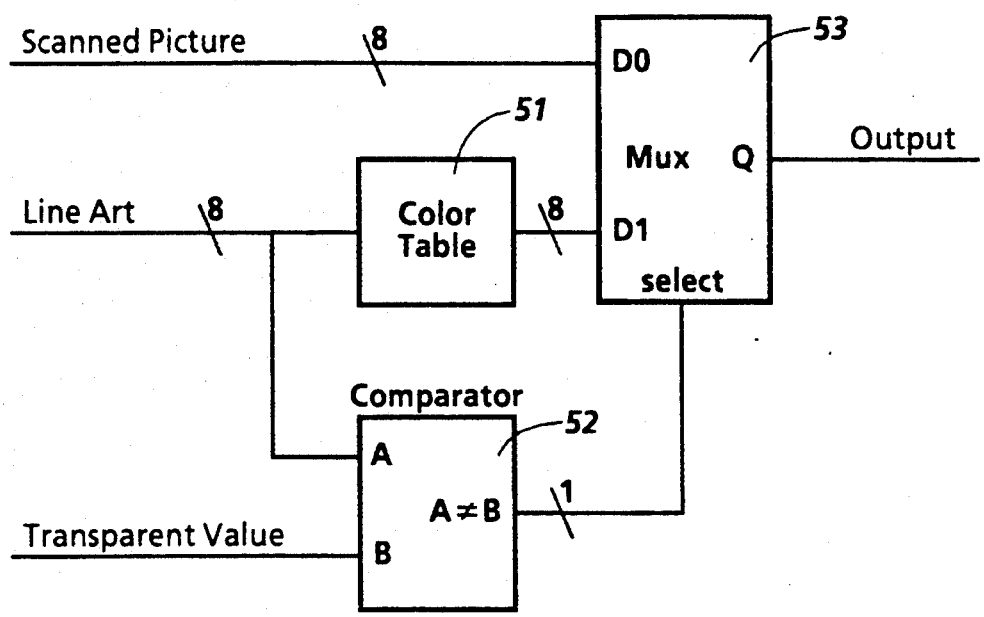
FIG. 5A is a block diagram of one version of the prior art.
Figure 5B:
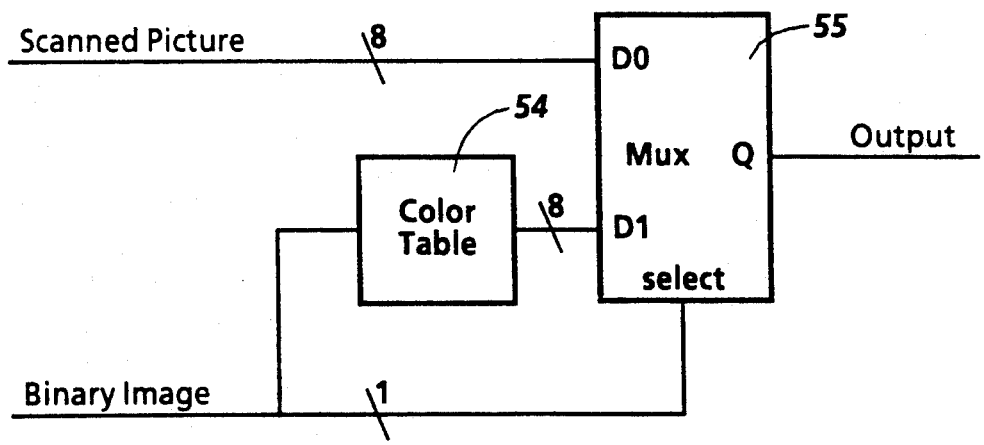
FIG. 5B is a block diagram of another version of the prior art.

In a multi-color printing or display system, the controller requires contone images and constant color pairs for each color or separation: cyan, magenta, yellow and black in the case of process color printer; or red, green and blue in the case of a color display. Because the images may not be stored as these colors, a color transformation may be required to convert the colors in which the images are stored in memory to the colors which the controller uses for printing or display. For example, a display image may be stored using luminance and chrominance coordinates, whereas the controller needs red, green and blue coordinates. FIG. 4B shows an embodiment that includes a color transformation. Three contone images are obtained from memory: ContoneY, ContoneCr, ContoneCb. The color transformation 45 converts them to a single contone image, when multiple separations are used singly one at a time, or to multiple contone images, when multiple separations are used simultaneously. The color transformation 45 can be implemented with commercially-available parts, such as a Bt294 device or a Bt281 device, both made by Brooktree.

In this implementation, the scan-line buffers for each channel occur in pairs; while one is being read along a scan line, the other is being written with the data for the next scan line. Because of the different spatial resolution of the various signals, not every channel's scan-line buffers have to be updated on each and every scan line, and the contents of a scan-line buffer can be used for more than one scan line.

Figure 6:
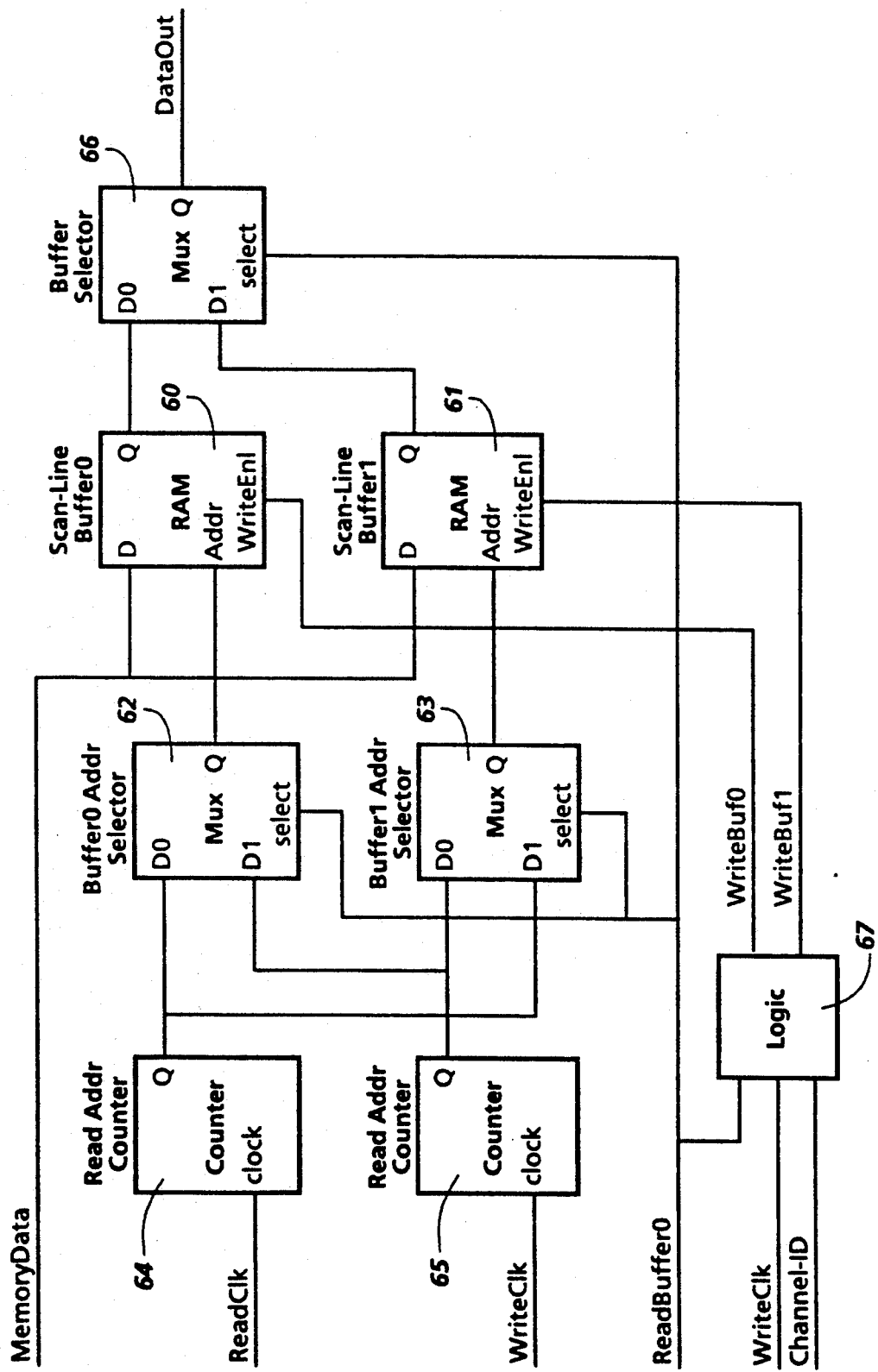
FIG. 6 is a more detailed block diagram of the embodiment of FIG. 4A.

FIG. 6 is a simplified block diagram of the ping-pong buffer arrangement for reading data from memory into one buffer while the other buffer is being used to supply output data for a channel. The read address counter 64 is originally set to an address that corresponds to the first address that is to be read out, and then the read clock is applied to the clock input to generate a sequence of addresses to be read from. Similarly, the write address counter 65 is set to a beginning address and is clocked by the write clock to generate a sequence of addresses to be written into. The outputs of both counters go to both the Buffer 0 and Buffer 1 address select multiplexers 62, 63, and the Read Buffer 0 signal is applied to the select input to select which will output the read addresses and which will output the write addresses. These outputs are applied to the scan-line buffers 0 and 1, RAM's 60, 61, so that the RAM that is being read will get the read addresses and the RAM that is being written will get the write addresses. Data from memory is applied to both, but only the one in the write mode will store it. Logic circuit 67 uses the Read Buffer 0 and Channel-ID signals to determine which buffer in write mode and to enable writing to it. Finally, the same read buffer signal will control the final multiplexer 66 to select the RAM being read from, to output data.

Figure 7A:
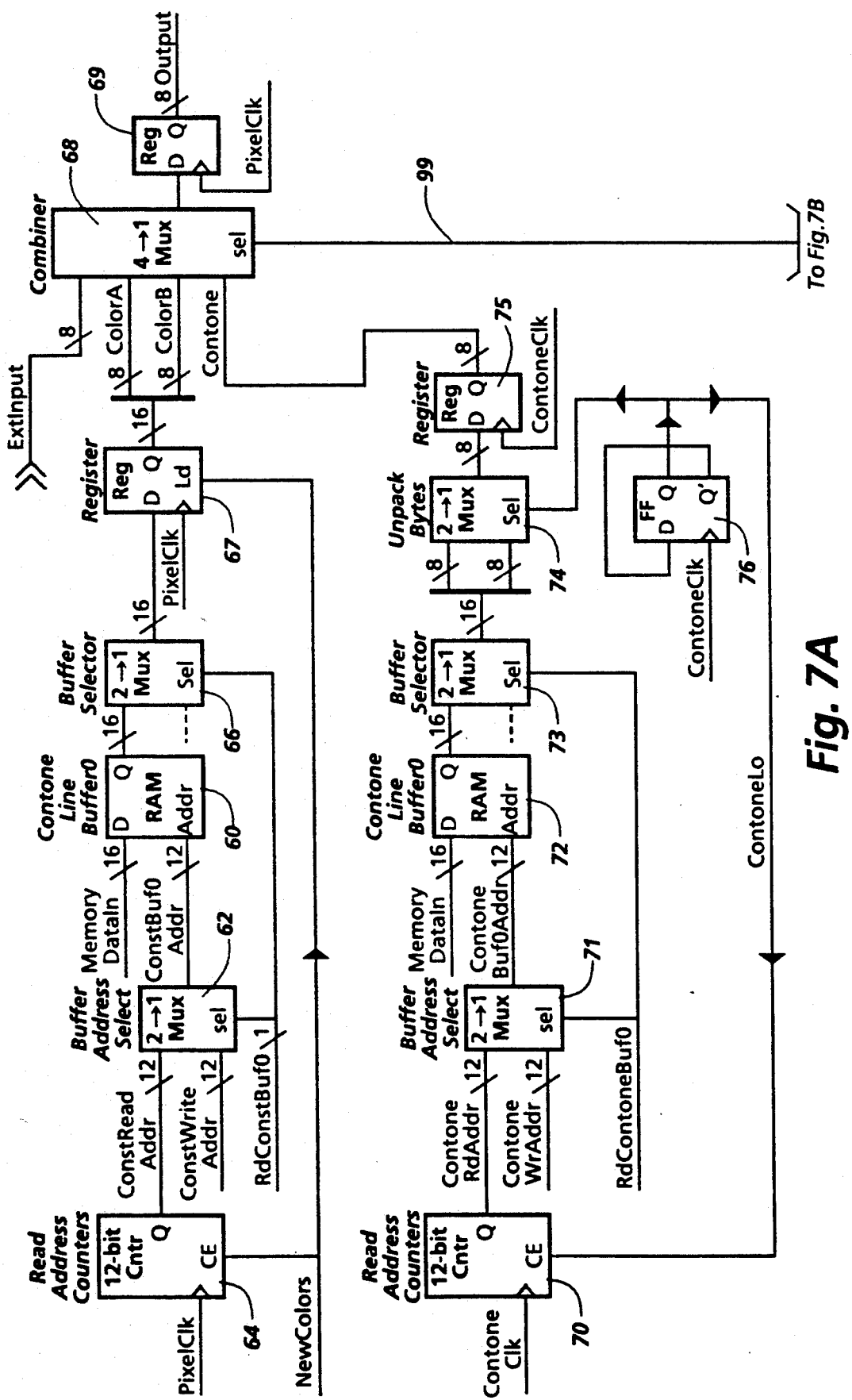
FIGS. 7a and 7b is a more detailed block diagram of the embodiment of FIG. 3A.
Figure 7B:
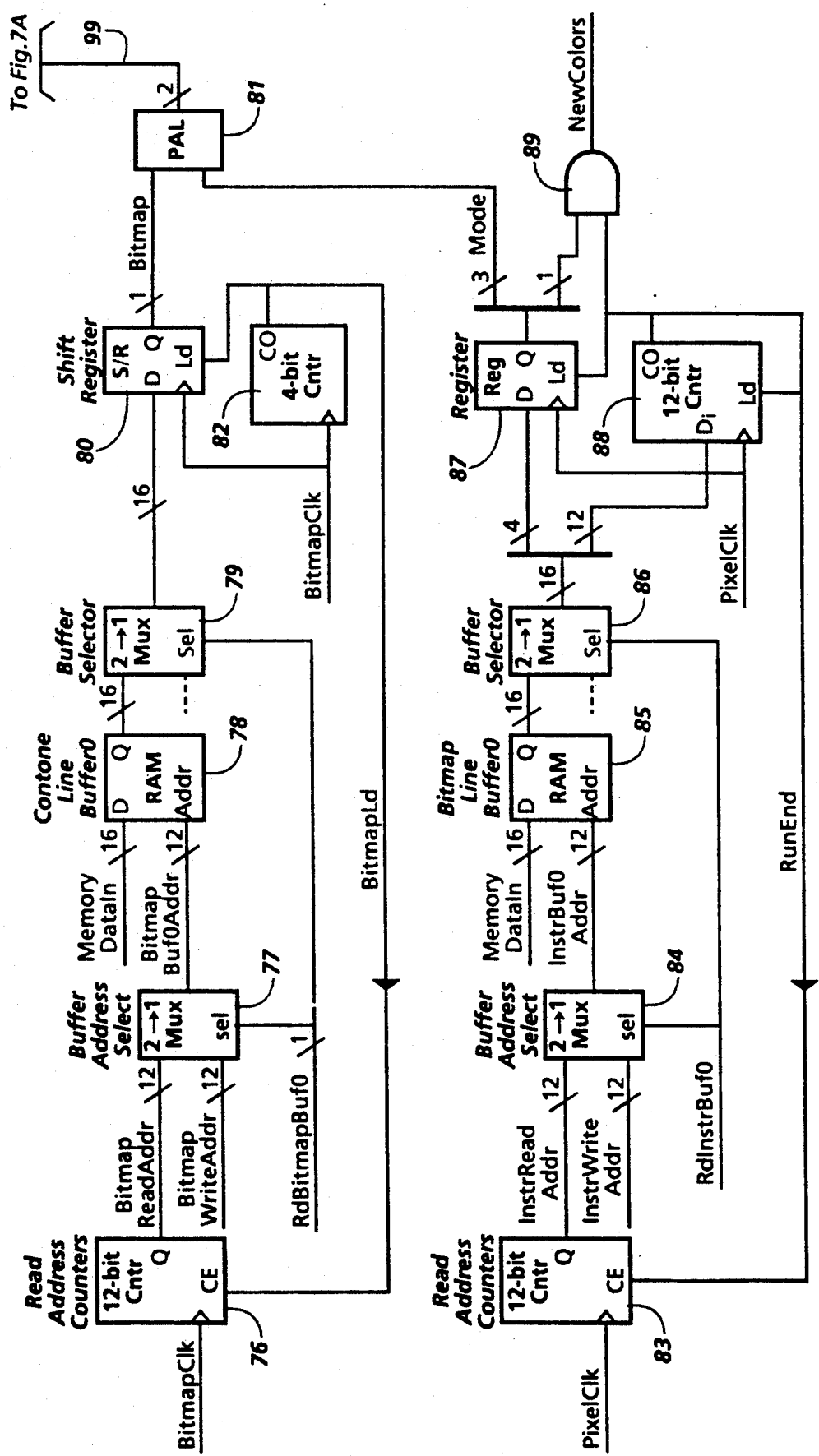

This circuit, with slight modifications, is used to mechanize the four data channels of the system which process the constant color pair, the 8-bit contone data, the 1-bit mask, and the control instructions, as shown in block diagram form in FIG. 7A and 7B.

In the first channel, the RAM 60 has the capacity to store one line of data, 4K by 16 bits, and contains a number of constant color pairs, eight bits per color, loaded into the RAM on the MemoryData line. This RAM 60 receives a 12-bit address from the multiplexer 62 which outputs either a constant color read address or a constant color write address from the read address counter 64 or the write address counter, not shown. The read address counter is driven by the pixel clock, but the counter is normally disabled by the GetNewPair signal which only allows the counter to count when a new pair of colors is requested. The RAM 60 either loads new color pair data from memory or outputs color pair data to the multiplexer 66. A second RAM, not shown, is the other half of the ping-pong arrangement, and each can be writing data while the other is reading it. Multiplexer 66 under control of the RdConstBuf0 signal selects one of the two RAM's and outputs the 16 bits of color pair data to register 67 which is loaded with the color pair data, 8 bits per color, and will continue to output this color pair until it is reloaded in response to the GetNewPair signal which will allow a new pair of colors to be loaded into the register 67. The final multiplexer 68 can now select either of the colors of the pair or any other color supplied on the Fixed line or the Contone line through the final output register 69.

The second channel delivers continuous tone data to the multiplexer 68. This data is continuously varying so the ping-pong buffer registers will be continuously loaded and read out while there is scanned image data along the scan line. In operation, similar to the first channel, the read address counter 70 is clocked by the contone clock, and the resultant address is sent to two multiplexers 71, one of which is shown, to select between read and write addresses, and the two RAM's 72, one of which is shown, will write or output continuous tone data. The buffer select multiplexer 73 will select either the first or second RAM output and supply that 16-bit data word to the unpack bytes multiplexer 74, which will separate that 16-bit word into two 8-bit words, and apply them to the register 75 for transmission to the combiner multiplexer 68. The flip flop 76 counts down the contone clock by two so that the multiplexer will output two 8-bit words each time the address counter 70 counts up once. It is assumed that the pixel clock has the highest frequency, and that all other clocks, such as the contone clock and the mask clock, have frequencies that are fractions of the pixel clock.

The third channel is for the 1-bit mask. A mask clock drives the 12-bit read address counter 76 and delivers the 12-bit address to two buffer address select multiplexers 77, one shown, which selects the read and write addresses. These are applied to the mask line buffer RAM's 78, one of two shown, to load one while the other is being read out. The buffer selector multiplexor 79 selects the output from one of the RAM's and transmits it through the shift register 80 which outputs 1 bit which is used by the programmable array logic or PAL 81, which outputs 3 bits to the Combiner, two bits being used to select between one of the two constant colors, the contone data and the fixed input, and one bit being used to enable the combiner multiplexer. The 4-bit counter 82 is used to count out the 16 bits in the register 80, one bit at a time.

The last channel is used for the instructions. The read address counter 83 is clocked by the pixel clock, which has the highest frequency of all the clocks, to generate the read address. The buffer address select 84 outputs either the read or write address to the instruction line buffer 85 which allows it to either read data from memory or output data through the buffer selector 86 to register 87. The output is separated into a 4-bit instruction and a 12-bit run length. The instruction is divided into a 3-bit mode signal for inputting to the programmable logic array 81, which controls the combiner 68, and one bit for requesting a new constant color pair. The run length is used to set the 12-bit counter 88 to a run length, setting the duration during which the instruction will not be changed. The carry output of this counter disables the read address counter 83 and the instruction register 87 for the duration of the count. At the end of the count, the carry out generates a GetNewPair pulse via gate 89 if the bit requesting a new constant color pair is set.

Figure 8A:
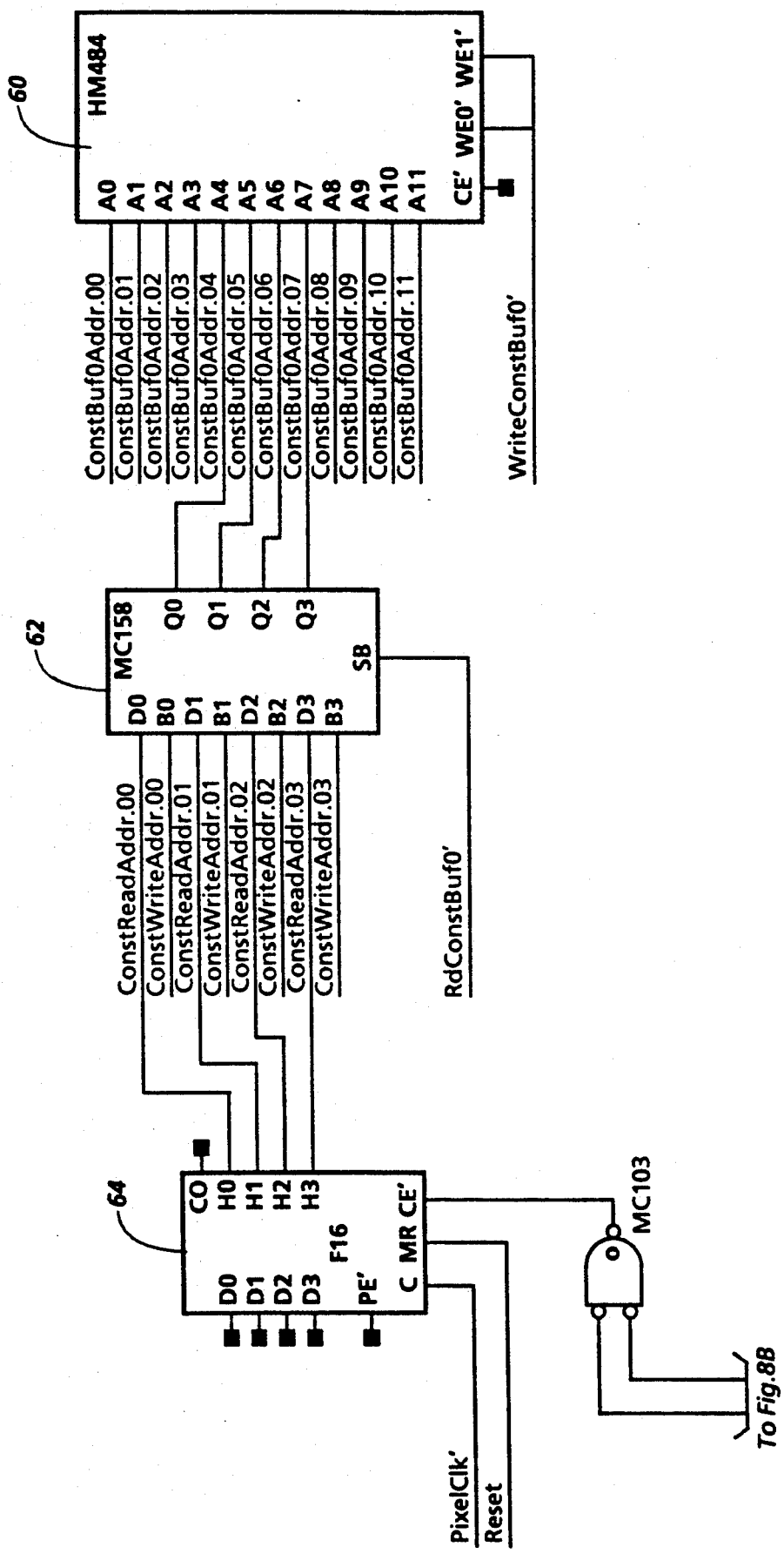
FIGS. 8a through 14b are detailed schematic diagrams of the system of FIG. 7.
Figure 8B:
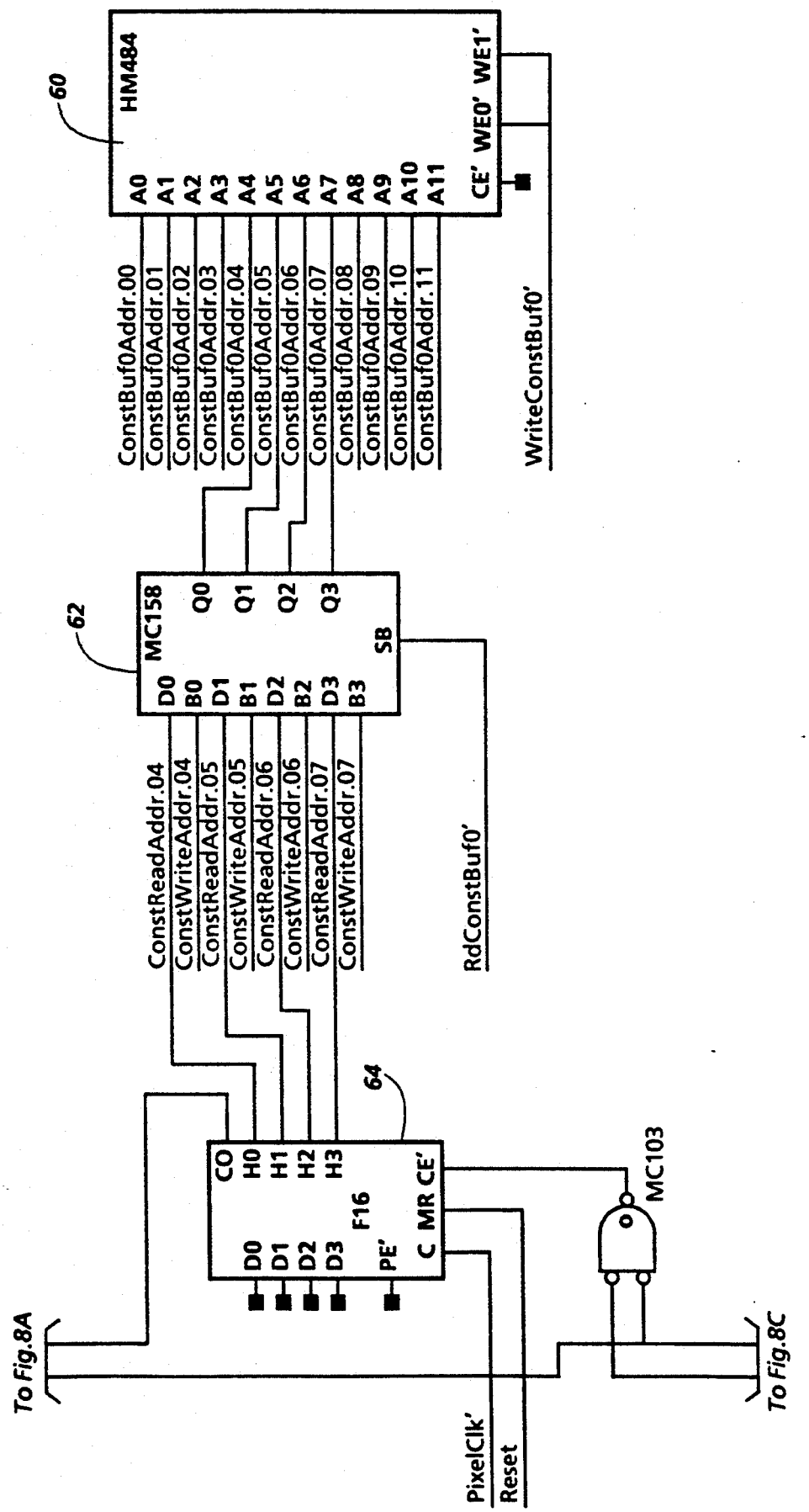
Figure 8C:
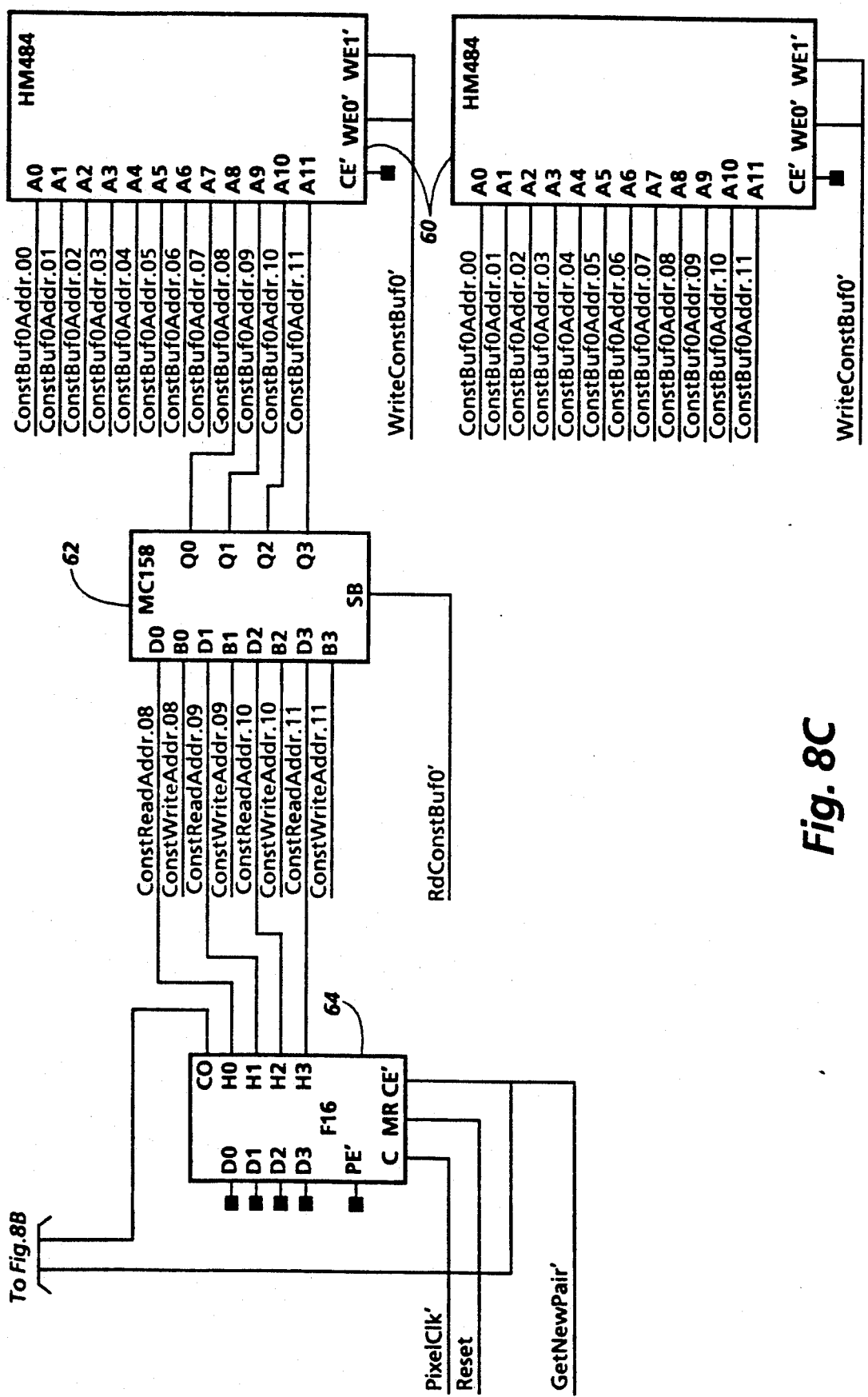

FIG. 8 is a detailed schematic diagram of the constant color pair read address counters 64, the buffer address select multiplexer 62 and the constant line buffer 0 RAM 60. The counters are driven by the pixel clock and are allowed to count up only when enabled by the GetNewPair signal. The write counters are not shown. The RdConstBuf0' signal forces the multiplexer to select one of the two sets of inputs to produce a twelve-bit address output, and that is used to address the RAM 60, the address portion of which is shown.

Figure 9:
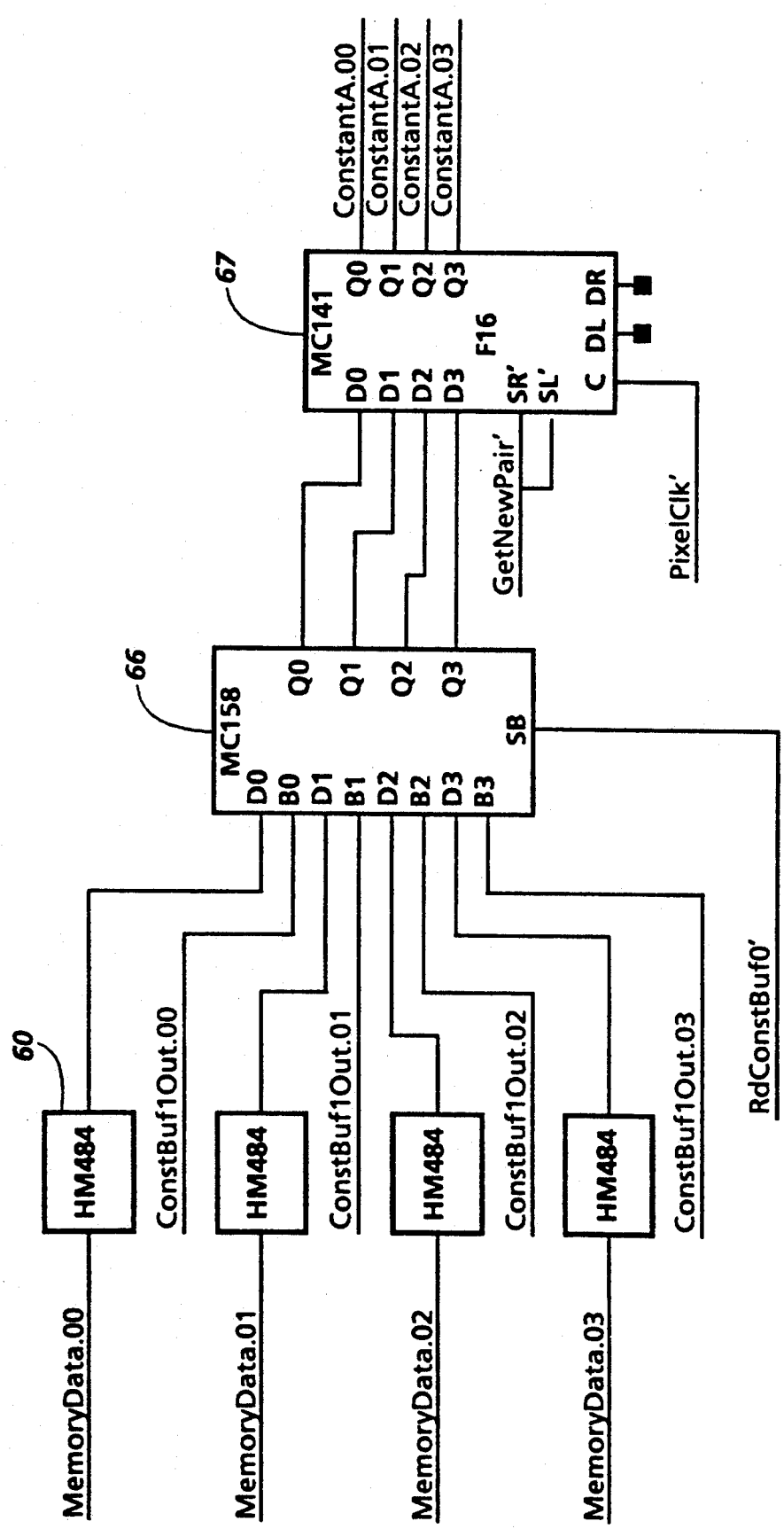

The first four bits of the RAM output circuit are shown in FIG. 9. The first 4 bits of RAM's 60 and 61 are applied to the input of the Buffer Selector multiplexer 66 which selects the four-bit output of one, and applies it through the register 67. The four bits shown are one half of constant color A of the constant color pair.

Figure 10A:
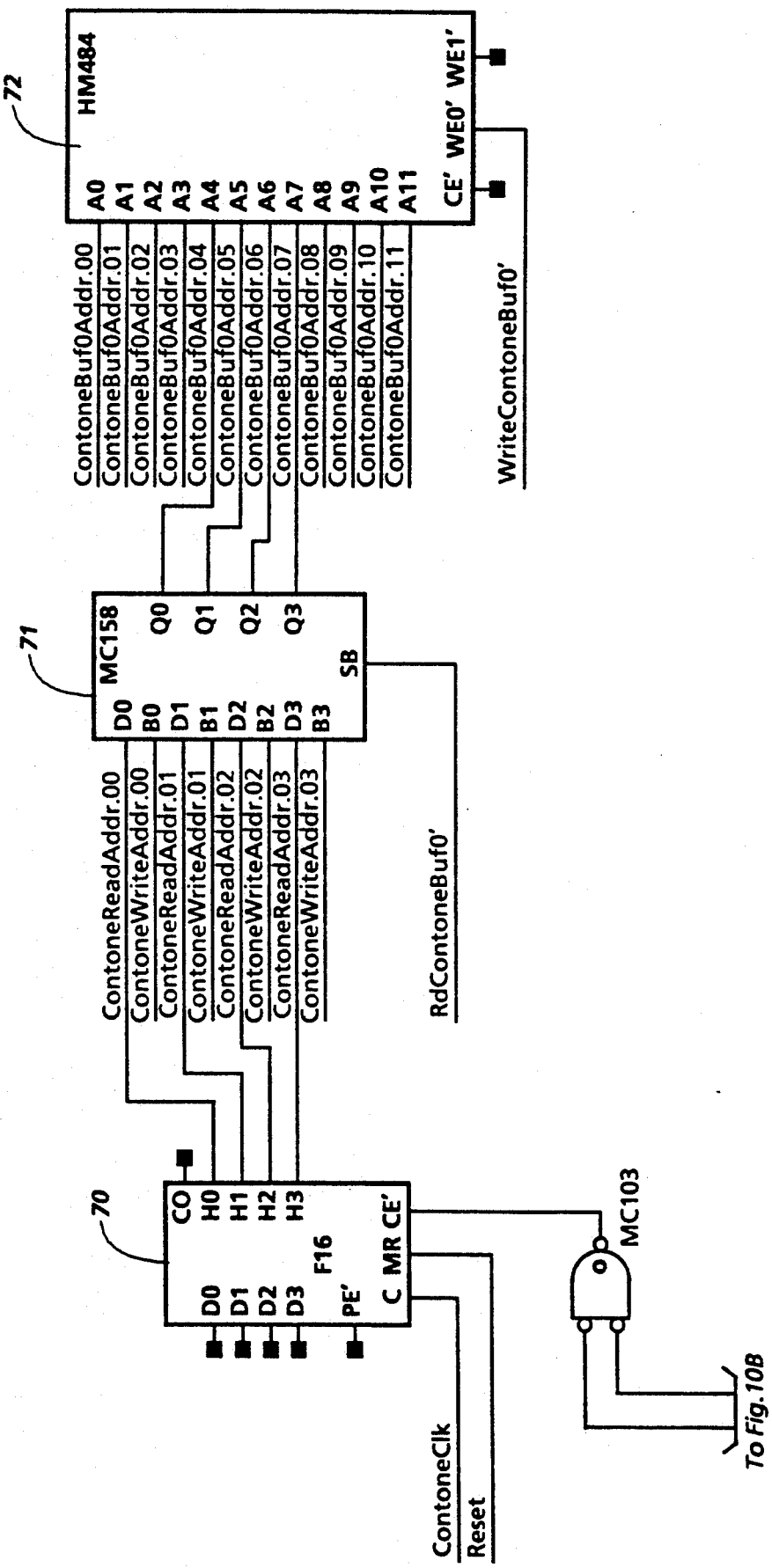
Figure 10B:
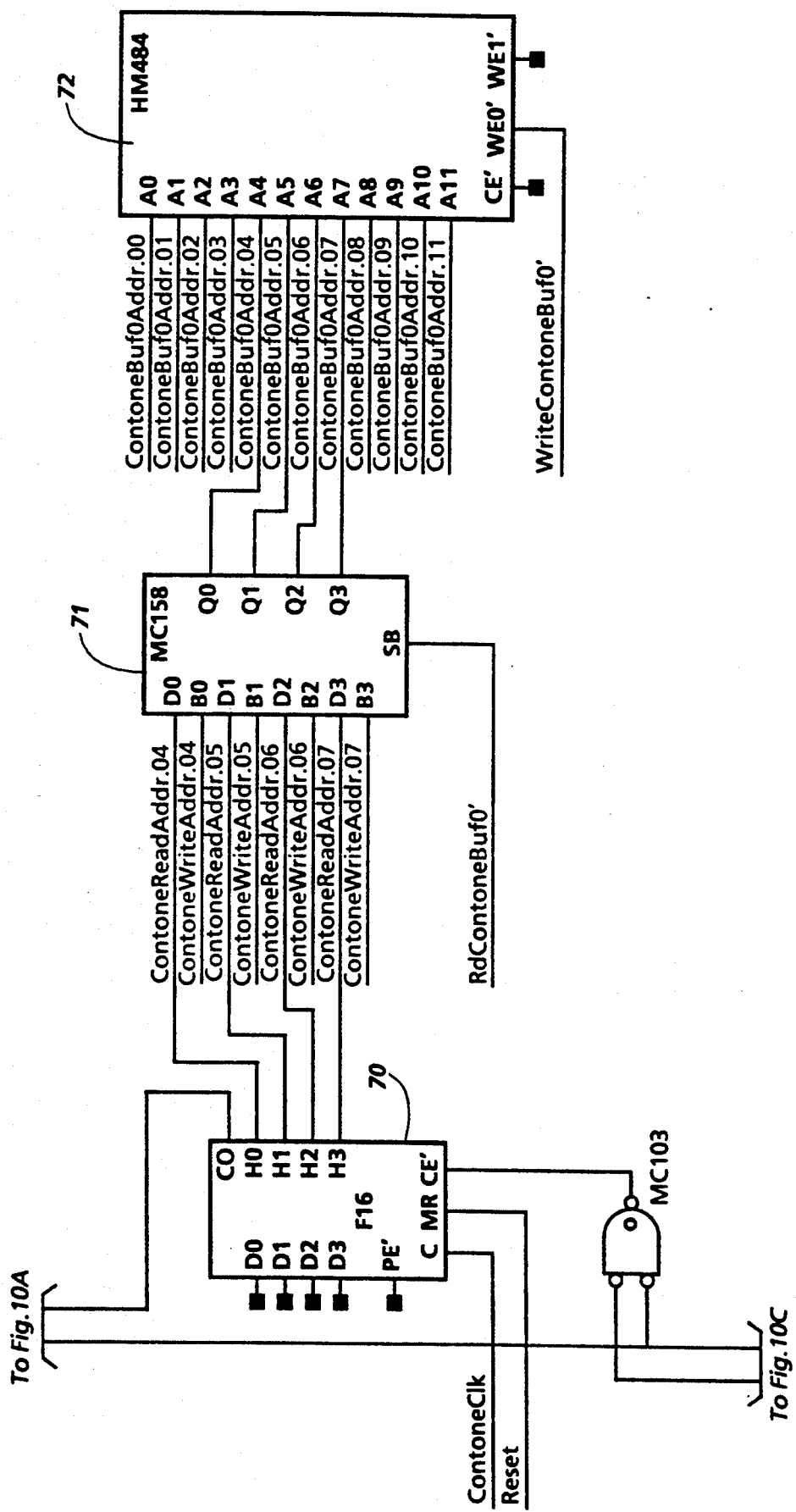
Figure 10C:
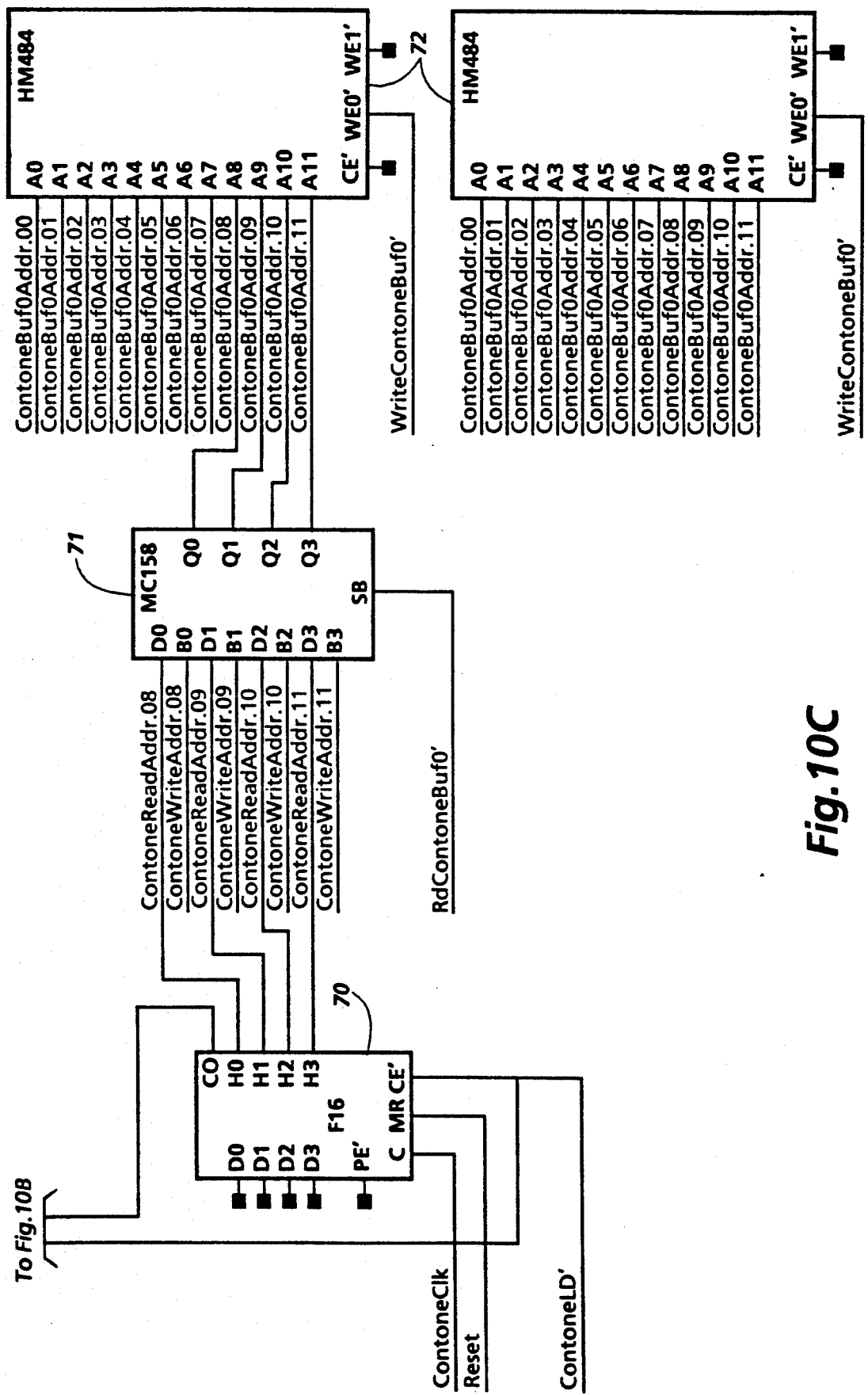

FIG. 10 is a schematic diagram of the read address counters 70, buffer select address multiplexers 71 and Contone line buffers 72. The counters are driven by the contone clock and a count may be enabled by the LdContone' signal. The two sets of 12 addresses lines are input to the buffer address select multiplexer 71 which routes the selected address to the address portion of the RAM 72.

Figure 11:
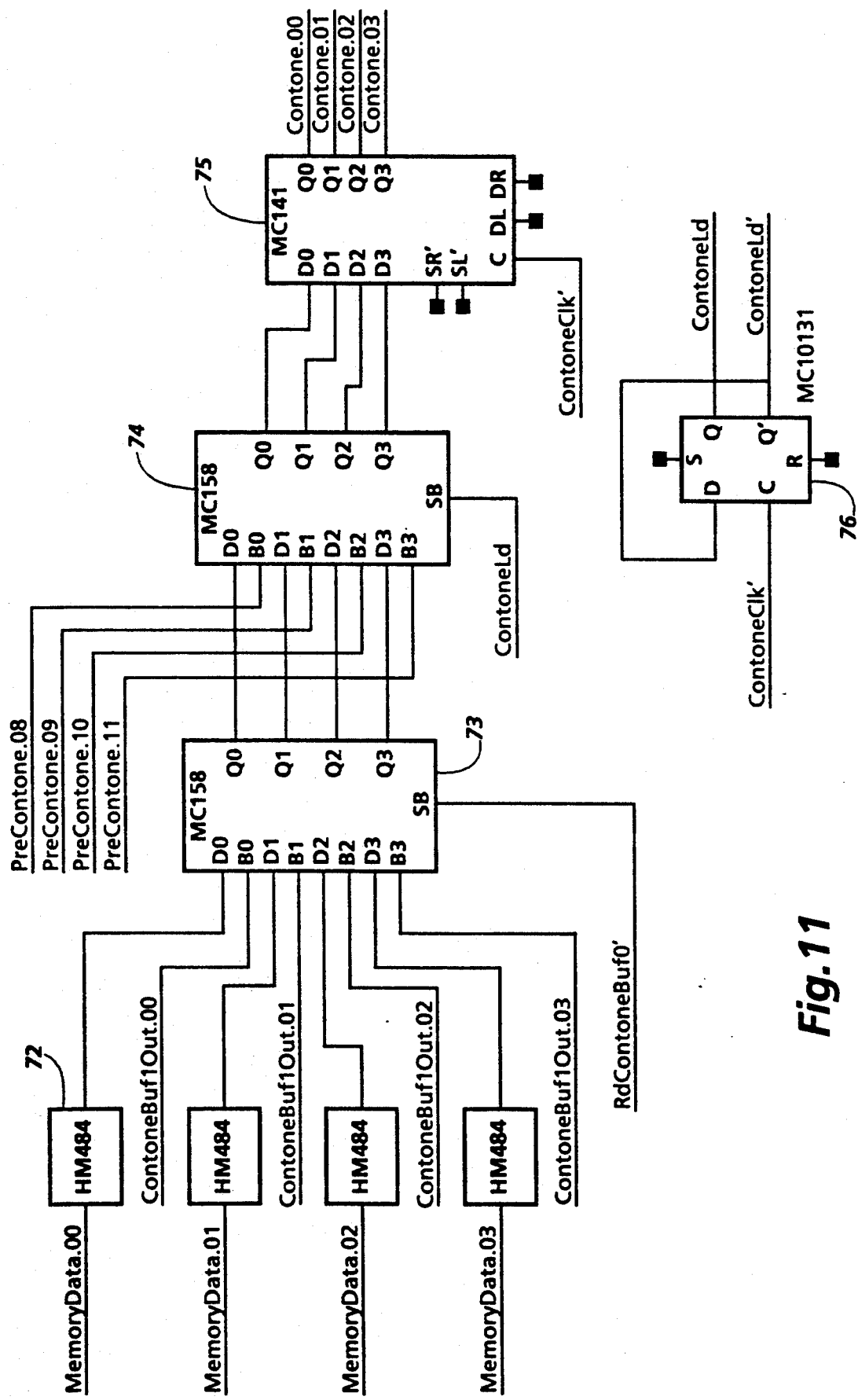

FIG. 11 shows the first four bits of the RAM 72, the buffer selector multiplexer 73, the unpack bytes multiplexer 74 and the register 75. Multiplexer 73 selects between the output data bits 0 to 3 of the contone buffer 0 and 1 RAM's, while a second multiplexer, not shown, selects between bits 8 to 11. The unpack bytes multiplexer 74 then selects one and then the other as the first four bits of successive continuous-tone pixels, which are then coupled out through register 75.

The schematic diagram of the memory addressing circuit for the mask channel is identical to that of the contone channel except that the read address counter 76 is count enabled by the LdMask' signal instead of the LdContone' signal, and is clocked by the MaskClk instead of the ContoneClk.

Figure 12A:
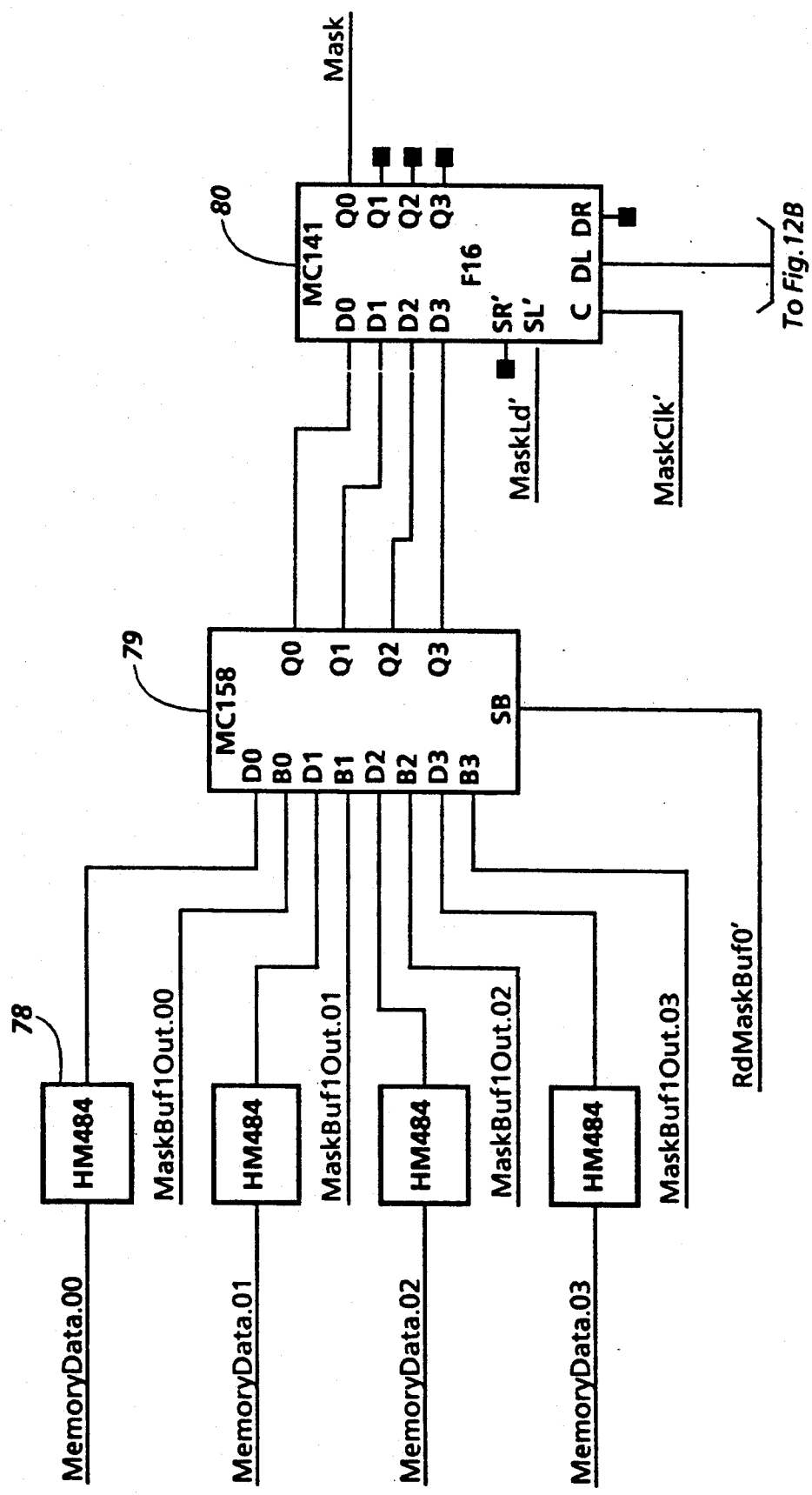
Figure 12B:
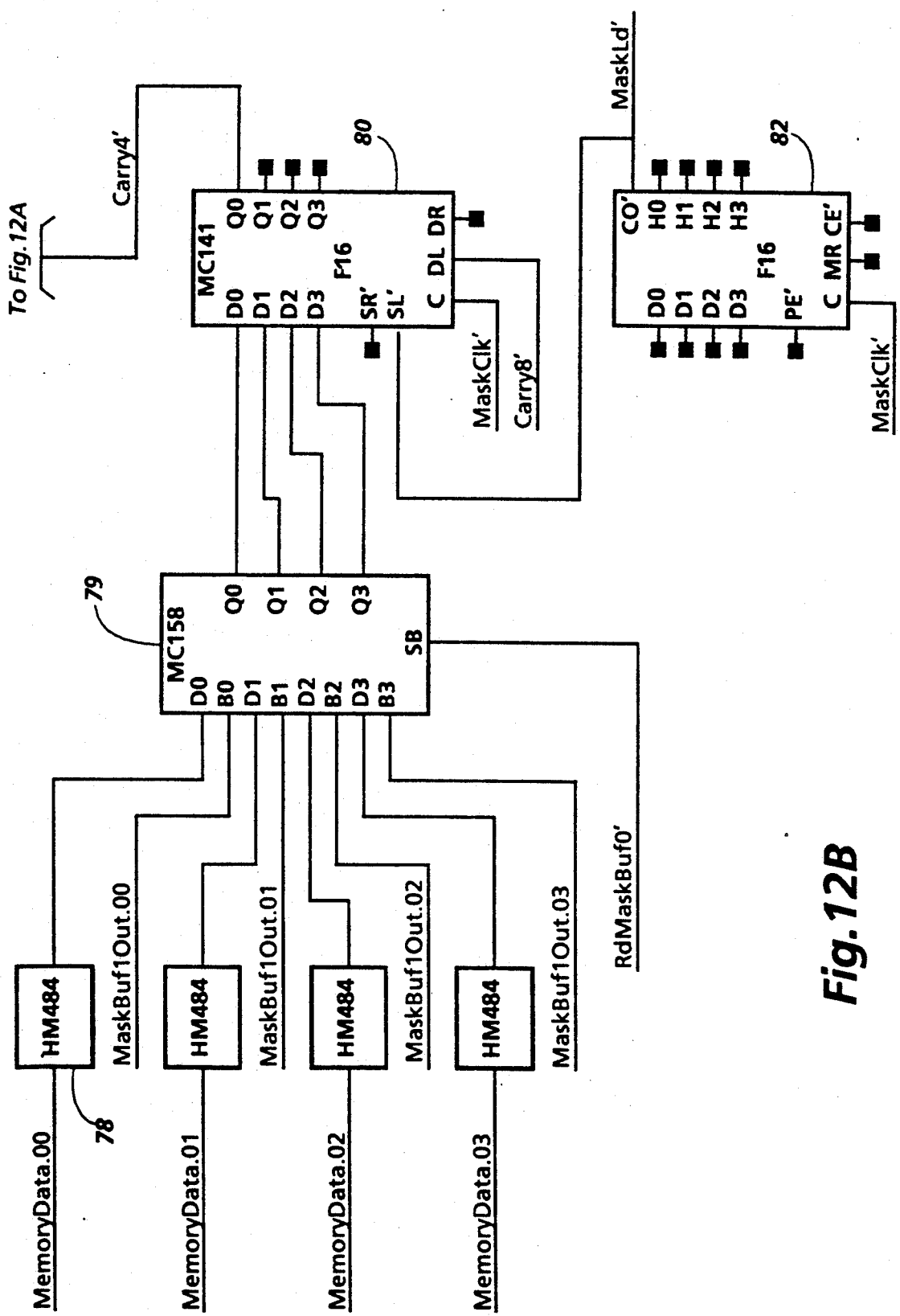

FIG. 12 shows the first 8 bits of the mask output from the RAM 78. The purpose of this circuit is to convert a 16-bit word into a 1-bit per clock output. As shown, the output of the RAM is applied to the buffer selector multiplexer 79 which selects one of the two inputs and applies that to the shift register 80. This register receives the sixteen bits in parallel, only eight are shown in this figure, and converts them to a 1-bit per mask clock serial output. The 4-bit counter 82 keeps a count of the bitmap mask clocks, and the carry out, LdMask', is used to load the register 80 with the next word. The Carry8' signal is the shifted output from the lower half of the shift register, not shown here.

The addressing section of the control channel is similar to that of the other channels. Here the counter is clocked by PixelClk and is enabled by the RunEnd signal to enable the counter to count at the end of a run-length code run.

Figure 13A:
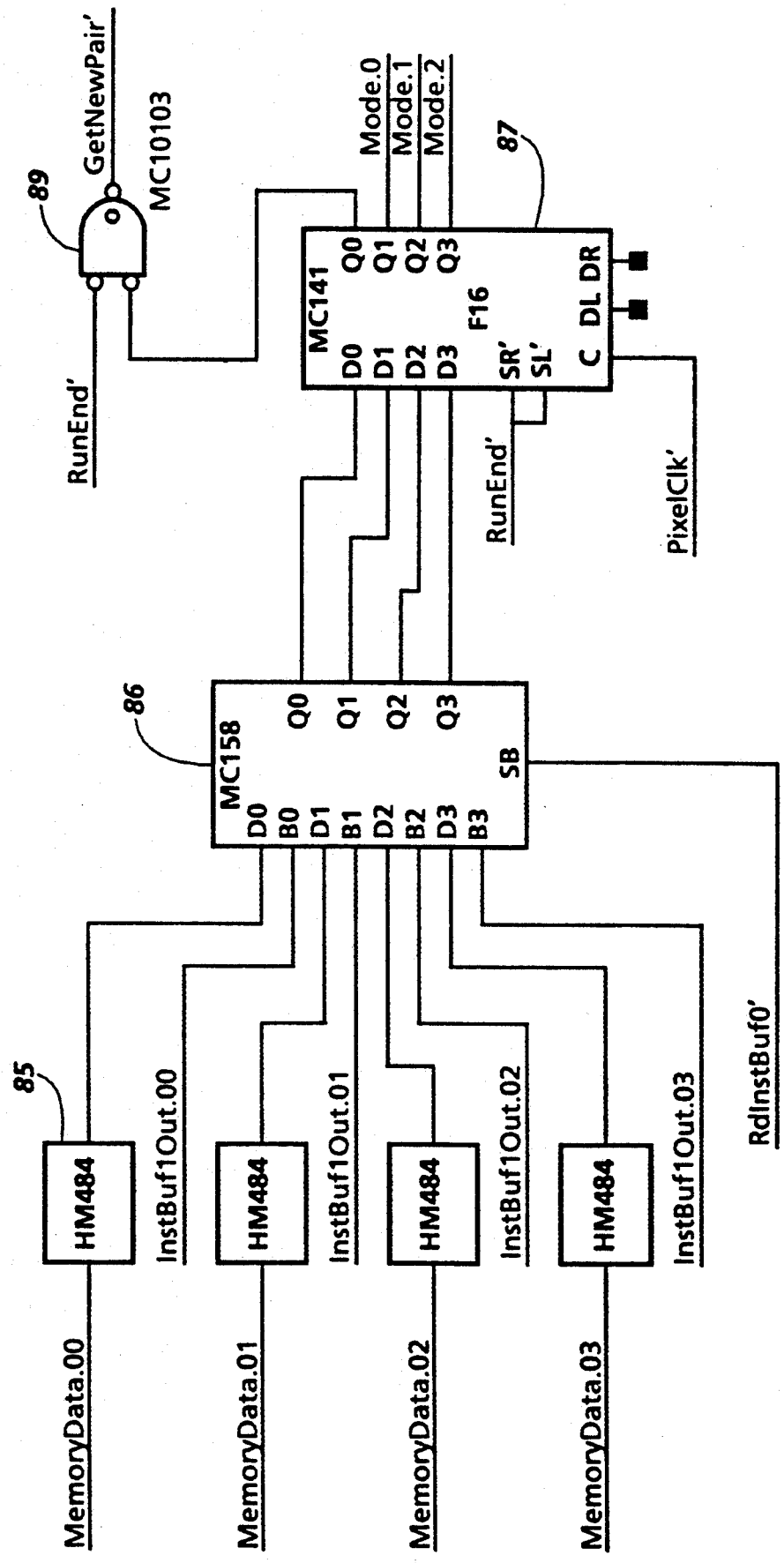
Figure 13B:
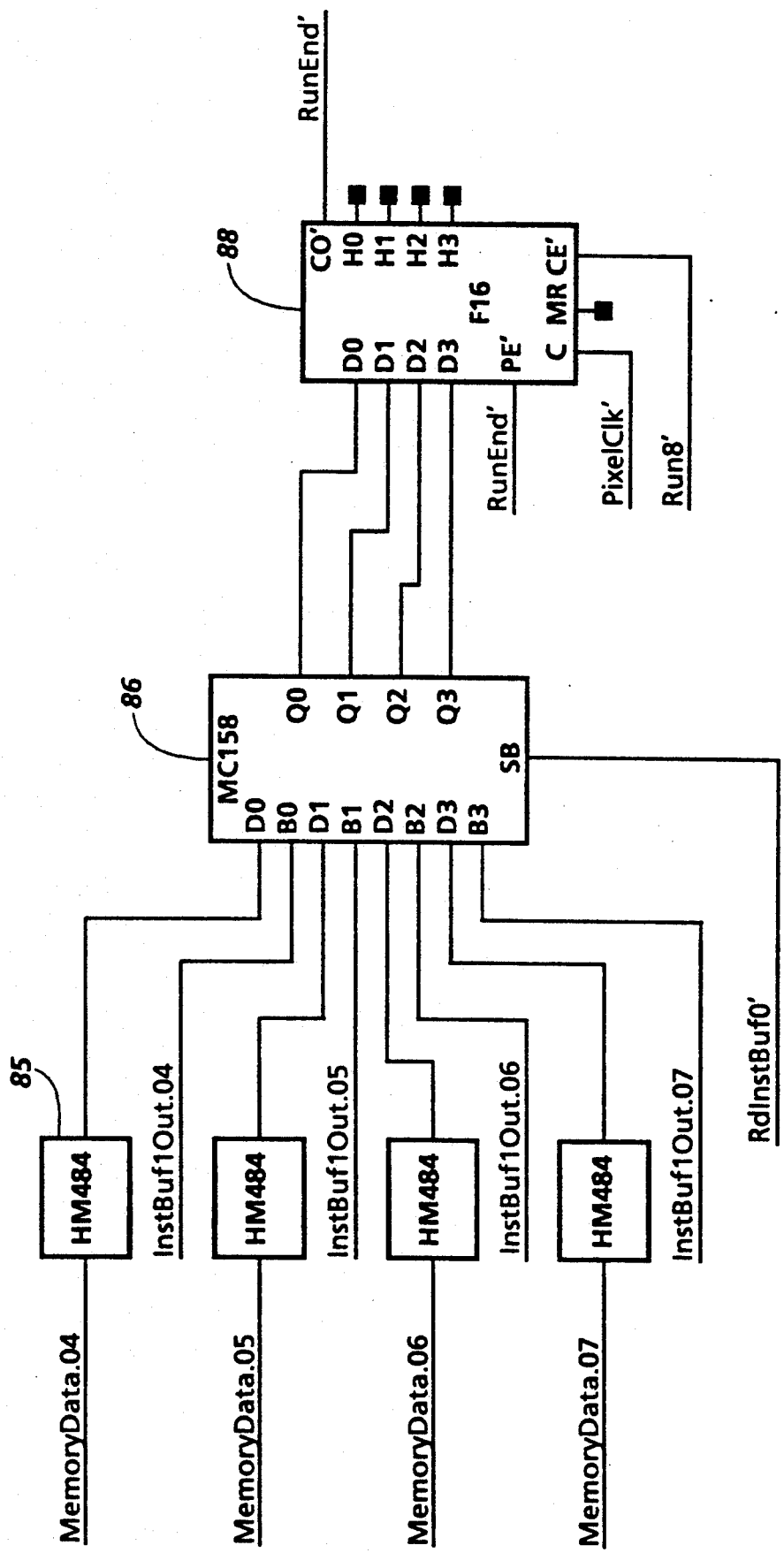

FIG. 13 shows half of the output of the RAM 84, the buffer selector multiplexer 86 and the register 88 which outputs one bit to the GetNewPair gate 89 and three bits of mode signal. One third of the 12-bit run length counter 88 is also shown in this diagram, the carry out being used as the counter 83 enabling signal RunEnd'. The Run8' signal is the carry out from the other two-thirds of the 12-bit run-length counter not shown in this diagram.

Figure 14A:
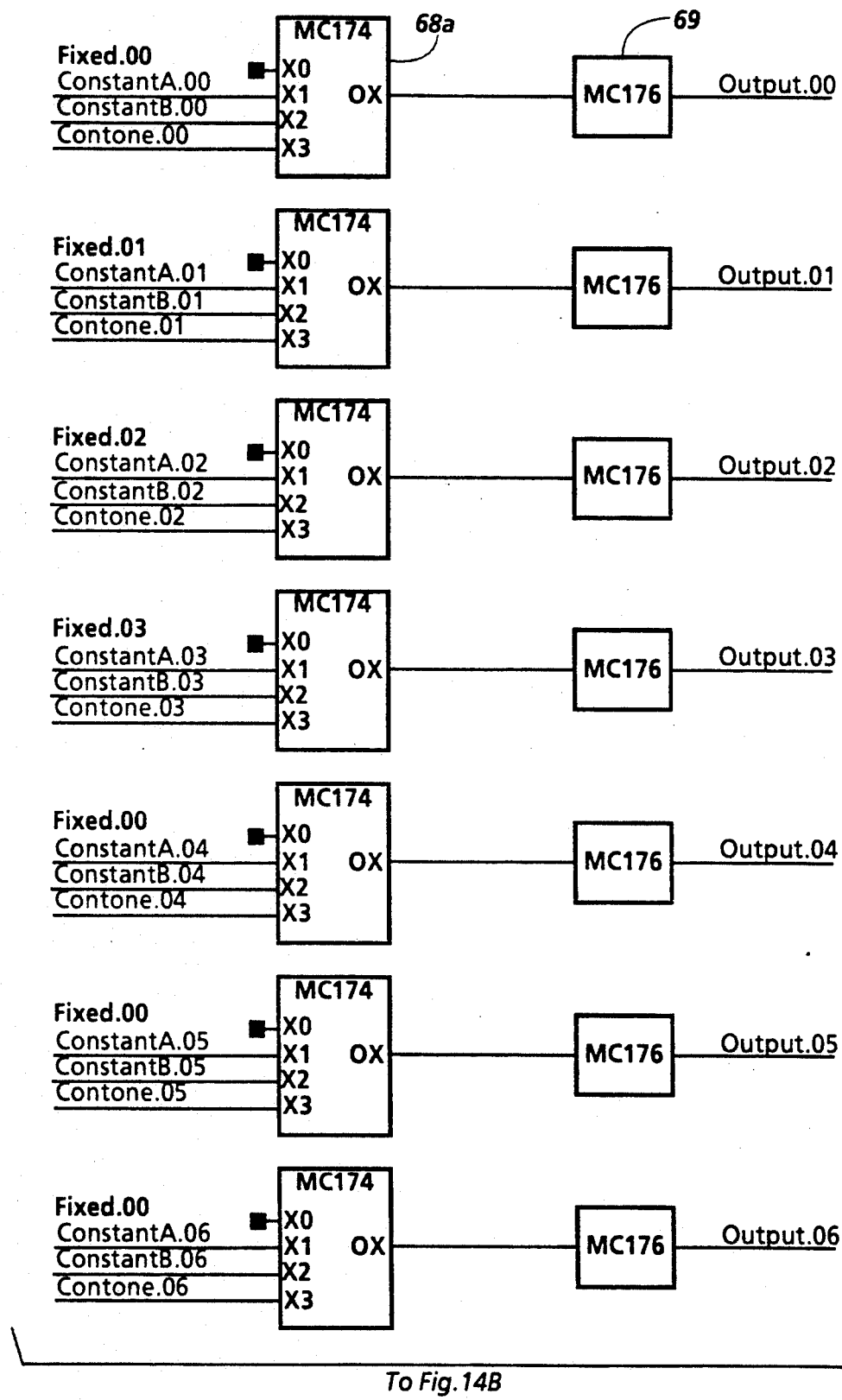
Figure 14B:
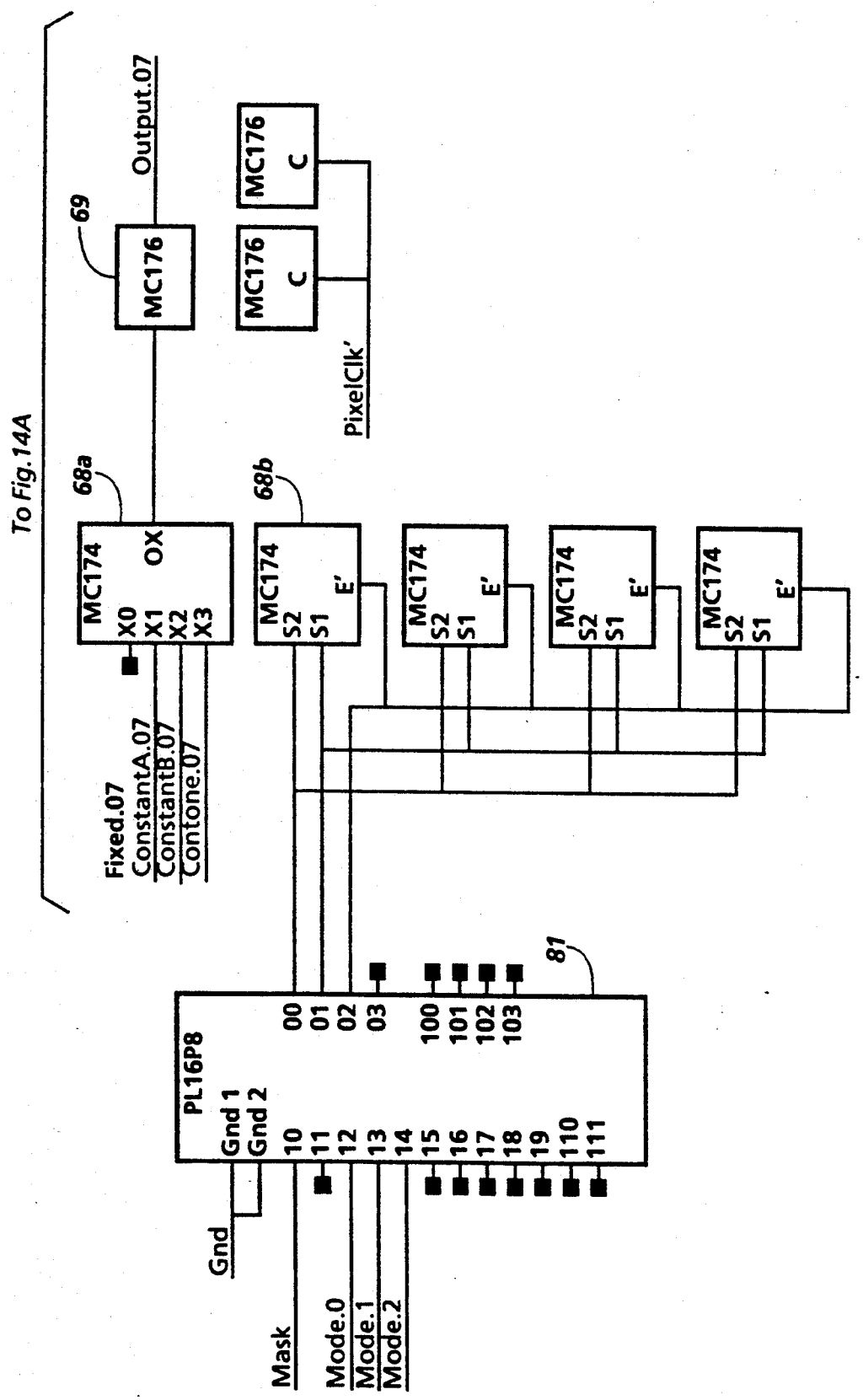

FIG. 14 is a schematic of the programmable logic array 81, combiner 68 and the output register 69. The programmable array logic is a PAL1016P8 device made by National Semiconductor, and the combiner multiplexer 68, comprising address control sections 68b and output portions 68a, are four MC10174 devices made by Motorola. The multiplexer 68 selects one of the four inputs, and the output is sent to the register 69, two MC10176 devices made by Motorola.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

I claim:

1. A controller for generating a series of output pixels to be output to a raster output device from a plurality of continuous tone image pixels, binary image bits and two constant colors, comprising:
   means for storing and outputting said two constant colors,
   means for generating a continuous tone pulse for each continuous tone image pixel,
   first memory means, responsive to said continuous tone pulse for storing and outputting said continuous tone image pixels, means for generating a pixel clock pulse for each output pixel, instruction memory means, responsive to said pixel clock pulse, for storing and outputting an instruction which selects two of the three outputs of said first memory means and said means for storing, means for generating a binary clock pulse for each binary image bit, said means for generating a binary clock pulse having a different frequency from said means for generating a continuous tone pulse for each continuous tone image pixel, second memory means, responsive to said binary clock pulse, for storing and outputting said binary image bits, means responsive to said instruction and said binary image bits from said second memory means for determining one of the two outputs selected by said instruction, and multiplexing means for receiving said two constant colors from said means for storing said two constant colors and said continuous tone image pixels from said first memory means and generating a series of output pixels therefrom in response to the output of said means for determining.

2. The controller of claim 1, for use in a multi-pass raster output device, wherein said instructions do not change between passes.

3. The controller of claim 1, for use in a multi-color raster output device, wherein said instructions and binary image do not change with a change of colors.

* * * * *